United States Patent
Zhang

(10) Patent No.: US 9,717,048 B2
(45) Date of Patent: Jul. 25, 2017

(54) METHODS FOR GENERATING NETWORK ENERGY SAVINGS IN A WIRELESS COMMUNICATION SYSTEM

(71) Applicant: ZTE Corporation, Shenzhen (CN)

(72) Inventor: Wenfeng Zhang, Plano, TX (US)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/687,769

(22) Filed: Apr. 15, 2015

(65) Prior Publication Data

US 2015/0223162 A1 Aug. 6, 2015

Related U.S. Application Data

(62) Division of application No. 13/578,572, filed as application No. PCT/US2011/025078 on Feb. 16, 2011, now Pat. No. 9,036,523.

(60) Provisional application No. 61/305,071, filed on Feb. 16, 2010.

(51) Int. Cl.
| | |
|---|---|
| *G08C 17/00* | (2006.01) |
| *H04W 52/02* | (2009.01) |
| *H04L 5/00* | (2006.01) |
| *H04L 27/26* | (2006.01) |

(52) U.S. Cl.
CPC ......... *H04W 52/0206* (2013.01); *H04L 5/005* (2013.01); *H04L 5/0005* (2013.01); *H04L 5/0007* (2013.01); *H04L 5/0048* (2013.01); *H04L 5/0082* (2013.01); *H04L 27/2613* (2013.01); *H04W 52/0203* (2013.01); *Y02B 60/50* (2013.01)

(58) Field of Classification Search
CPC .......... H04W 52/0203; H04W 52/0206; H04L 27/2613; H04L 5/0005; H04L 5/0007; H04L 5/005; H04L 5/0082; H04L 5/0048
See application file for complete search history.

(56) References Cited

U.S. PATENT DOCUMENTS

| | | | |
|---|---|---|---|
| 8,755,365 B2 | 6/2014 | Lee et al. | |
| 2009/0249153 A1* | 10/2009 | Zhang | H04L 1/1887 714/748 |
| 2012/0220327 A1* | 8/2012 | Lee | H04W 72/1273 455/509 |

OTHER PUBLICATIONS

Xiao, "Energy saving mechanism in the IEEE 802.16e wireless MAN," IEEE Communications Letters, Jul. 2005, 9(7):595-597.

(Continued)

*Primary Examiner* — Kan Yuen

(74) *Attorney, Agent, or Firm* — Duane Morris LLP

(57) ABSTRACT

Disclosed herein are methods and apparatus for network energy savings in a wireless communication system, such as the 3GPP LTE system. Particularly, one such method reduces power consumption in a base station by selectively muting or disabling downlink transmissions of certain control signal symbols in one or more subframes or frames. The disclosed methods and apparatus can apply independently or in combination in both FDD and TDD systems.

9 Claims, 14 Drawing Sheets

(56) References Cited

OTHER PUBLICATIONS

Yeh et al., "Comparative analysis of energy-saving techniques in 3GPP and 3GPP2 systems," *IEEE Transactions on Vehicular Technology*, Jan. 2009, 58(1):432-448.
International Search Report and Written Opinion dated Oct. 26, 2011, from related International Patent Application No. PCT/US2011/025078, 3 pages.
International Preliminary Report on Patentability dated Aug. 21, 2012, from related International Patent Application No. PCT/US2011/025078, 5 pages.

* cited by examiner

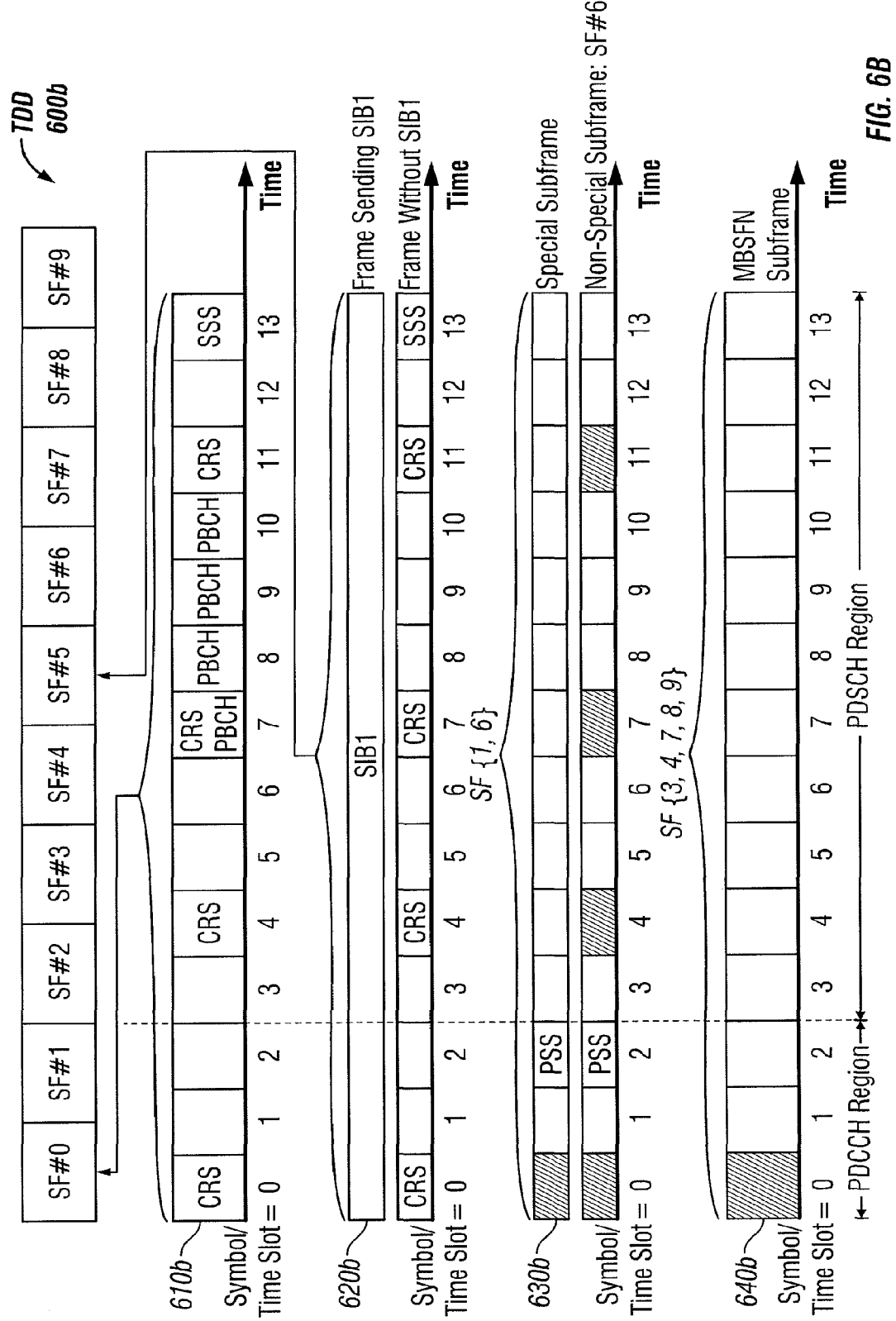

METHODS FOR GENERATING NETWORK ENERGY SAVINGS IN A WIRELESS COMMUNICATION SYSTEM

CROSS-REFERENCE TO RELATED APPLICATIONS

This application is a divisional application of U.S. patent application Ser. No. 13/578,572, filed on Oct. 29, 2012, entitled "Methods and Apparatus for Network Energy Savings in a Wireless Communication System," which is a U.S. National Stage Entry Application of International Patent Application No. PCT/US2011/025078, filed on Feb. 16, 2011, entitled "Methods and Apparatus for Network Energy Saving in a Wireless Communication System," and which claims priority to U.S. Provisional Patent Application No. 61/305,071 filed on Feb. 16, 2010, entitled "Methods and Systems for Network Energy Saving in Wireless Communication Systems," the contents of each of which are incorporated by reference herein in their entireties.

FIELD OF THE INVENTION

The present invention relates generally to Energy Saving (ES) management in the network infrastructure of wireless communication systems, and more particularly to methods and apparatus for reducing power consumption in downlink transmissions in the 3rd Generation Partnership Project (3GPP) Long-term Evolution (LTE) wireless communication systems using frequency division duplex (FDD) and time division duplex (TDD).

BACKGROUND

Energy saving and power reduction have been and will continue to be an area of prime interest in the wireless communication community. Almost every mobile device manufacturer and provider is required to implement and incorporate into their mobile terminal products power-saving techniques as required under the wireless communication standards, such as the mandatory features of handset discontinuous transmission (DTX) and reception (DRX) that can help improve the battery life in mobile products. Most mobile network operators or carriers are also faced with strong requirements to reduce their greenhouse emissions and energy consumption as they keep building out and maintaining the network infrastructure in order to provide better wireless communication services to customers. In recent years, the deployment of network equipment on a massive scale has led to a steady increase in pollution and energy consumption worldwide. Particularly in emerging markets where basic infrastructure elements, such as electricity grids and connections, are often underdeveloped, there is even higher energy consumption due to the network operator's use of conventional equipments such as diesel generators in building cell towers and base station sites. As a result, many authorities ranging from local governments to international organizations have formulated and are enforcing environmental requirements that mobile network operators need to comply with. Energy Saving (ES) mechanisms are becoming an integral part of the new generation radio access networks such as LTE, and consequently, of most wireless communication systems. A good ES solution needs to ensure no service degradation or inefficiencies in the network. This means, backward compatibility should be fully considered in designing an ES scheme, especially in networks that serve a number of legacy user equipments (UEs).

A large part of the network energy consumption is attributed by the power usage in base stations of a wireless communication network. In addition to power consumed for active cooling, different base station components, whether in a receiver or transmitter, need power to perform baseband processing, signal processing and many other computing tasks. In particular, the RF components in a base station, mainly the power amplifier (PA) in a transmitter, consume large amounts of power. Part of the power transmitted from an antenna can be lost in the PA. Sometimes the PA efficiency (defined as a ratio between the PA output power and input power) can be less than 50%. Such power loss can only be avoided by temporarily turning off the PA. Therefore, determining how to reduce power loss and consumption in a PA can be crucial to the overall energy efficiency in a base station, which ultimately can significantly contribute to the network energy savings in the entire wireless communication system.

SUMMARY OF THE INVENTION

The disclosed exemplary embodiments are directed to solving issues relating to one or more of the problems presented in the prior art, as well as providing additional features that will become readily apparent by reference to the following detailed description when taken in conjunction with the accompanying drawings.

One embodiment is directed to a method for energy savings in a wireless network. This method reduces downlink transmissions of a reference signal by selectively muting reference signal symbols in a plurality of subframes of a frame in accordance with an energy saving (ES) scheme, each subframe divided into a first region and a second region, wherein the ES scheme is configured to select from the plurality of subframes a first set of subframes having reference signal symbols transmitted in their first region and a second set of subframes having reference symbols transmitted in their second region. Under the ES scheme, the method further comprises one or more of the following: disabling transmissions of reference signal symbols in the first region of all other subframes outside the first set of subframes; identifying subframes outside the second set of subframes; excluding subframes that carry at least a content signal symbol from the identified subframes to determine remaining subframes; and disabling transmissions of reference signal symbols in the second region of the remaining subframes. In one embodiment, the wireless communication system is configured to provide downlink transmissions of a content signal according to a repetition pattern, and the ES scheme is configured to modify or cancel the repetition pattern for downlink transmitting the content signal.

Another embodiment is directed to a method for reducing power consumption in downlink transmissions of one or more frames in a wireless communication system, wherein each frame comprises a plurality of subframes and each subframe is divided into at least a first region and a second region in a time domain. This method comprises the following: selecting a first group of subframes from the plurality of subframes, each of the first group of subframes having at least a control signal symbol in the first region; for each subframe not selected in the first group, disabling transmission of any control signal symbol in the first region; selecting a second group of subframes from the plurality of subframes, each of the second group of subframes having one or more control signal symbols in the second region; and for each subframe not selected in the second group, disabling transmission of any symbol in the second region unless the subframe carries a particular content signal.

Yet another embodiment provides an apparatus for reducing power consumption in downlink transmissions of one or more frames in a wireless communication system, wherein each frame comprises a plurality of subframes and each subframe is divided into at least a first region and a second region in a time domain. Such an apparatus comprises: means for selecting a first group of subframes from the plurality of subframes, each of the first group of subframes having at least a control signal symbol in the first region; means for disabling transmission of any control signal symbol in the first region of each subframe not selected in the first group; means for selecting a second group of subframes from the plurality of subframes, each of the second group of subframes having one or more control signal symbols in the second region; and means for disabling transmission of any symbol in the second region unless the subframe carries a particular content signal in each subframe not selected in the second group.

An alternative embodiment is directed to a computer program product for reducing power consumption in downlink transmissions of one or more frames in a wireless communication system, wherein each frame comprises a plurality of subframes and each subframe is divided into at least a first region and a second region. The computer program product is embodied in computer-readable storage medium comprising instructions, while executed, causing a computer to perform: selecting a first group of subframes from the plurality of subframes, each of the first group of subframes having at least a control signal symbol in the first region; for each subframe not selected in the first group, disabling transmission of any control signal symbol in the first region; selecting a second group of subframes from the plurality of subframes, each of the second group of subframes having one or more control signal symbols in the second region; and for each subframe not selected in the second group, disabling transmission of any symbol in the second region unless the subframe carries a particular content signal.

Also, there is an embodiment providing a base station in a wireless communication system, which comprises a transmitter configured for downlink transmissions of a frame comprising a plurality of subframes, each subframe being divided into at least a first region and a second region; a downlink signal processor coupled to the transmitter; and a controller coupled to the downlink signal processor, the controller comprising a power reduction module configured to selectively disable downlink transmissions of control signal symbols by: selecting a first group of subframes from a plurality of subframes, each of the first group of subframes having at least a control signal symbol in the first region; for each subframe not selected in the first group, disabling transmission of any control signal symbol in the first region; selecting a second group of subframes from the plurality of subframes, each of the second group of subframes having one or more control signal symbols in the second region; and for each subframe not selected in the second group, disabling transmission of any symbol in the second region unless the subframe carries a particular content signal. The transmitter in the base station is coupled to one or more power amplifiers (PAs), and the PA-on time in each PA is reduced by the power reduction module.

Further features and advantages of the present invention, as well as the structure and operation of various embodiments of the present disclosure, are described in detail below with reference to the accompanying drawings.

BRIEF DESCRIPTION OF THE DRAWINGS

Various exemplary embodiments are described in detail with reference to the following figures. The drawings are provided for purposes of illustration only and merely depict exemplary embodiments of the disclosure. These drawings are provided to facilitate the reader's understanding of the invention and should not be considered limiting of the breadth, scope, or applicability of the disclosure. It should be noted that for clarity and ease of illustration these drawings are not necessarily drawn to scale.

FIGS. 6a-b show an exemplary downlink transmission and PA-on time distribution per frame under a second ES scheme according to an embodiment;

DETAILED DESCRIPTION OF EXEMPLARY EMBODIMENTS

Figure 1:
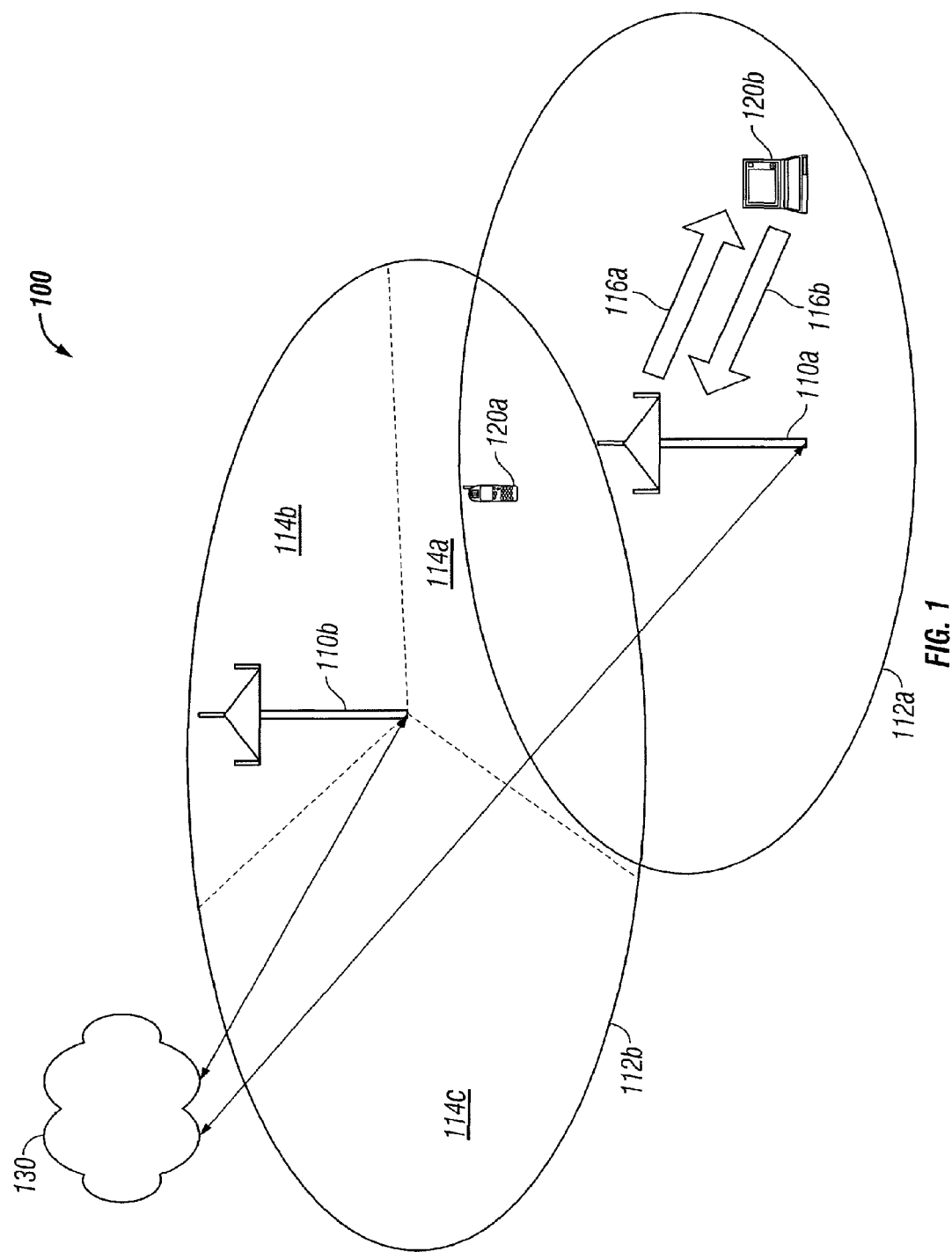
FIG. 1 is a simplified functional block diagram showing an exemplary wireless communication system for implementing embodiments of the invention.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments disclosed herein are directed to methods and apparatus for network energy savings in a wireless communication system, such as the 3GPP LTE system. These ES methods, schemes and solutions, whether independently or in combination, can be applied to a wireless communication system configured to include both FDD and TDD systems. More specifically, various ES schemes will be described in terms of how to reduce power consumption (e.g., the fraction of PA-on time) in downlink transmissions in a base station without significant compromises in backward compatibility. It should be appreciated that the embodiments described herein are based on 3GPP LTE specification by referring to the terms and concepts therein (e.g., CRS, PBCH, SIB1, PDCCH, PDSCH, frames, subframes, RE, RB, symbols, etc.), the application of these embodiments are not so limited, but can include any wireless communication systems using different standards other than LTE.

FIG. 1 is a simplified functional block diagram of an exemplary wireless communication system 100 in which embodiments for energy savings can be implemented. The wireless communication system 100 includes a plurality of base stations, such as base stations 110a, 110b, each supporting a corresponding service or coverage area 112a, 112b. The base stations are capable of communicating with wireless devices within their coverage areas. For example, the first base station 110a is capable of wirelessly communicating with a first subscriber or client station 120a and a second subscriber or client station 120b within the coverage area 112a. Typically, the communications between a base station and a client station are supported by a modulation and/or repeat-coding scheme depending on various factors, such as QoS level of the client station, location or environment in which the client station operates. For example, the first base station 110a can use one type of modulation and repeat-coding scheme in communicating with the client station 120a, while another type of modulation and repeat-coding scheme in communicating with the client station 120b. As shown in FIG. 1, the first client station 120a is also within coverage area 112b and is capable of communicating with the second base station 110b.

In this description, the communications path from the base station to the client station is referred to as a downlink 116a and the communications path from the client station to the base station is referred to as an uplink 116b. On both downlink and uplink, the radio signal transmissions over the time are divided into periodic frames (or subframes, slots, etc). Each radio frame contains multiple time symbols that include data symbols (DS) and reference symbols (RS). Data symbols carry the data information, while the reference symbols are known at both transmitter and receiver, and are used for channel estimation purposes.

Although for simplicity only two base stations are shown in FIG. 1, a typical wireless communication system includes a much larger number of base stations. In a typical wireless communication system, the base stations 110a and 110b also communicate with each other over a backhaul network 130. The backhaul network 130 may include wired and wireless communications links, as well as supervisory network entities. The base stations 110a and 110b can also be configured as gateways, access points, radio frequency (RF) repeaters, frame repeaters or nodes and include any wireless network entry point.

The base stations 110a and 110b can be configured to support an omni-directional coverage area or a sectored coverage area. For example, the second base station 110b is depicted as supporting a sectored coverage area 112b. The coverage area 112b is depicted as having three sectors, 114a, 114b, and 114c, each of which can also be referred to as a coverage area. In typical embodiments, the second base station 110b treats each sector, for example sector 114a, as effectively a distinct coverage area.

Although only two subscriber or client stations 120a and 120b are shown in the wireless communication system 100, typical systems are configured to support a large number of client stations. The client stations 120a and 120b can be mobile, nomadic or stationary units. The client stations 120a and 120b are often referred to as, for example, mobile stations, mobile units, subscriber stations, wireless terminals or the like. A client station can be, for example, a wireless handheld device, a vehicle mounted device, a portable device, client-premise equipment, a fixed-location device, a wireless plug-in accessory or the like. In some cases, a client station can take the form of a handheld computer, a notebook computer, a wireless telephone, a personal digital assistant, a wireless email device, a personal media player, meter-reading equipment or the like.

In one embodiment, the wireless communication system 100 is configured to comprise both FDD and TDD systems. Different communication techniques such as Orthogonal Frequency Division (OFDM) can be implemented in the wireless communication systems. The wireless communication system 100 can also be configured to substantially comply with a standard system specification, such Long Term Evolution (LTE), or it may be a proprietary system. The embodiments described herein are not limited to application to LTE systems. The description in the context of an LTE system is offered for the purposes of providing a particular example only.

In general, from the perspective of the standard specification, such as the LTE standard (e.g., LTE Rel-10), most energy saving (ES) solutions can be classified into three categories: ES in the time domain, ES in the frequency domain and ES in the spatial domain. The ES solutions from different categories can be used independently or in combination. For illustration purposes only, the following paragraphs will describe a few ES solutions in each category.

1. ES Solutions in Frequency Domain

For energy saving purposes, bandwidth split and shrinking can help reduce transmission power. However, if a power amplifier (PA) is configured to operate at an optimized level of output power, a further reduced output power can compromise the PA efficiency. In that case, the total energy savings in PA can be marginal and undesirable. Additionally, reducing bandwidth in exchange for saving energy consumption may constrain the network operator's service capability in low-traffic areas where user traffic can be unpredictable and highly dependent upon the available bandwidth. For example, to make an emergency call with positioning services may need a large system bandwidth in the LTE system.

Another ES solution in the frequency domain can be used in the case of carrier aggregation. If each carrier to be aggregated has a separate PA attached thereto, when the carriers are aggregated, their attached PA can be turned off to save power. However, this solution may not be applicable for contiguous aggregated carriers that are supported by a single PA. Although most ES solutions in the frequency domain can be applied independently or jointly, their overall effectiveness can be limited.

2. ES Solutions in Spatial Domain

Because each antenna port in a base station has its own PA, one direct ES solution in the spatial domain is to reduce the number of antenna ports and their associated PAs. However, this solution reduces power consumption at the cost of cell coverage. As an example, in a 2-by-2 port configuration for transmit diversity, if the antenna ports are reduced from 2 to 1, there will be at least a 3 dB loss on link gain. Under the urban-micro NLOS pathloss model given by 3GPP for a hexagonal cell, which is defined by $$PL=36.7 \log_{10}(d)+22.7+26 \log_{10}(f_c) \text{ (Antenna height being 10 m)}$$

the 3 dB loss on link gain can be translated into a much smaller cell coverage, with a new cell's radius reduced to $10^{(-3/36.7)}=82.8\%$ of the original cell. The resulting "coverage holes" will certainly interfere with the quality of service by network operators in their advertised coverage area. In order to seal the coverage holes, the network operator can increase the transmission power in each cell, which, however, defeats the purpose of this ES solution by reducing antenna ports.

An alternative spatial domain ES solution is to partially switch off certain cells and increase transmission powers in the remaining cells to keep full cell coverage. However, sometimes the required power increase in the remaining cells can out weigh the power savings from switching off cells. For example, in a 2-D hexagonal cell layout in an urban-micro, if every other cell on both X-axis and Y-axis is switched off, that means, a total ¾ of the cells are switched off. In order to retain the full coverage, the radius of remaining cells needs to be doubled. This requires the transmission power of each remaining cell to increase to $10^{(36.7 \log_{10}(2)/10)}=12.7$ times of the original power. If the transmission power of each remaining cell stays the same, increasing the base station antenna height in the remaining active cells can also help keep the full cell coverage. However, to increase the antenna height can be practically difficult and costly, and sometimes not even feasible due to local regulations. Considering the cell coverage loss, these spatial domain ES solutions may not be effective enough in actual network operations.

3. ES Solutions in Time Domain

A common goal among the ES solutions in the time domain is to reduce the fraction of downlink transmission time or PA-on time, namely, the time duration in which downlink transmissions take place. By reducing the PA-on time, a PA can consume less power and achieve energy savings in the base station.

Figure 2:
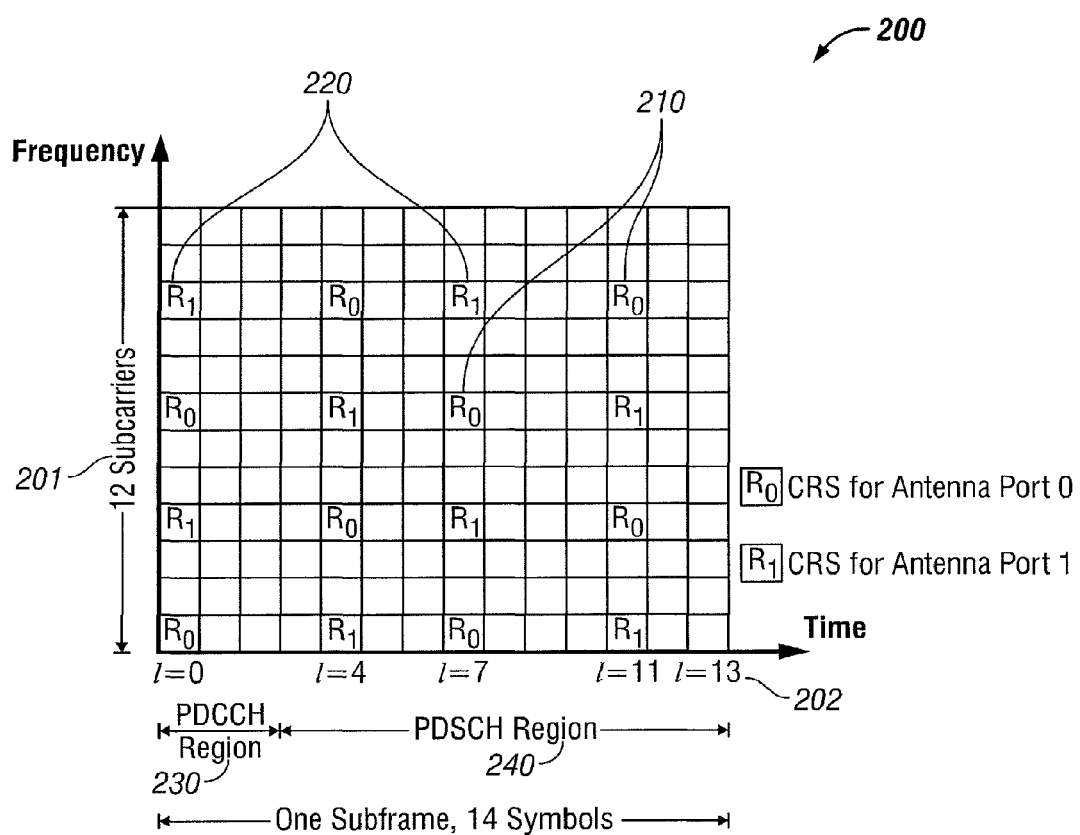
FIG. 2 shows an exemplary resource block that comprises subcarriers in a frequency domain and time symbols in a time domain according to an embodiment.

In the 3GPP LTE system, the transmission time is partitioned into 10 ms-long frames. Each frame is further equally divided into 10 subframes, typically labeled as SF #0, SF #1, SF #2 . . . and SF #9. FIG. 2 shows an exemplary resource block (RB) 200 according to one specific system configuration (called normal cyclic prefix, or normal-CP) in LTE systems. As seen in FIG. 2, one subframe contains 14 equally-divided time slots or symbols 202 in the time domain, usually labeled as l=0, 1, 2, 3 . . . 12, 13. Also, a regular subframe is typically partitioned into two parts: a physical downlink control channel (PDCCH) 230 and a physical downlink shared channel (PDSCH) 240. The PDCCH region 230 normally occupies the first few symbols at the start of a subframe and carries user-specific control channels, and the PDSCH region 240 typically occupies the remaining symbols the subframe and carries general-purpose traffic. Besides the time symbols 202 in the time domain, the RB 200 in FIG. 2 is also defined by the bandwidth in the frequency domain, which is equally divided into 12 subcarriers 201. As such, one resource block is defined over a rectangular two-dimensional (2-D) or frequency-time resource area, and more specifically, it covers 12 contiguous subcarriers in the frequency domain and one subframe or 14 time symbols in the time domain, as shown in FIG. 2. Each resource block comprises a plurality of resource elements (RE) and each RE is defined by single units in the frequency and time domains. For example, a RE 210 or 220 in FIG. 2 is defined by a symbol in the time domain and a subcarrier in the frequency domain. In the following description, a notation <subframe_index; symbol_indices> will be used to show a signal location in the time domain, where subframe_index is a subframe index in a frame and symbol_indices mean one or more symbol index in the indexed subframe.

The PA-on time can be minimized if the transmission management unit or scheduler in a base station can schedule downlink transmissions to the extent that, for a certain period of time duration (e.g., a frame, a subframe or a few symbols or time units), there is no downlink traffic (voice or data) transmission. In theory, this can be achieved in a low traffic load cell in a 3G/4G wireless system. In reality, however, even in the absence of any user traffic, a base station still needs to transmit at least some mandatory common signals, i.e., signals broadcast throughout a cell that the base station serves. Under the LTE standard specification, the following downlink transmissions are required to stay active even in case of zero-load of user traffic.

a. Primary Synchronization Signal (PSS) and Secondary Synchronization Signal (SSS)

These two signals are used for the initial synchronization and detection of any cell identification after a mobile or client device is powered up. Their transmissions are usually required to repeat in every frame. In a normal-CP system configuration, the transmission of PSS occurs at time locations of <0; 6> and <5; 6> in the FDD system. In other words, within each frame, PSS downlink transmission occurs at symbol 6 of two subframes, subframe #0 and subframe #5. For the TDD system, PSS transmission occurs at time locations of <1; 2> and <6; 2>. The transmission of SSS occurs at time locations of <0; 5> and <5; 5> for the FDD system, and time locations of <0; 13> and <5; 13> for TDD. The transmission of PSS and SSS will be further explained later with reference to FIGS. 3a-b, 4a-b, 5a-b, 6a-6b and 7a-b.

b. Physical Broadcast Channel (PBCH)

PBCH is used for broadcasting essential cell information to mobile devices or clients within a cell. PBCH transmission also repeats in each frame, and usually occurs at time locations of <0; 7~10>. This means, PBCH is transmitted over time symbols 7-10 in subframe #0.

c. Cell-Specific Reference Signal (CRS)

CRS is often used for downlink signal strength measurement. It is also used for coherent demodulation of PDSCH in the same resource block. Sometimes it can be used for verification of cell identification done on PSS and SSS. CRS transmissions have the same pattern in each regular subframe. For example, in case of two transmission antenna ports, the CRS transmission occurs at time locations of <*; 0, 4, 7, 11>, where * represents any regular subframe in the normal-CP configuration. Referring back to FIG. 2, in one resource block, CRS transmission for one antenna port covers two subcarriers in the frequency domain, for example, two $R_0$ (CRS for antenna port 0) and two $R_1$ (CRS for antenna port 1). Also, as seen in FIG. 2, CRS transmission covers symbols 0, 4, 7 and 11 in the time domain. It should be noted that, the CRS symbol 0 is transmitted within the PDCCH region 230, and all other CRS symbols 4, 7 and 11 are in the PDSCH region 240.

d. System Information Block (SIB)

SIB is the broadcast information that is not transmitted over PBCH. SIB is usually carried in specific PDSCH to be decoded by every handset or mobile device. This is because the capacity of PBCH is very limited compared to the total system information size. Therefore, a large portion of system information is transmitted over the PDSCH with a special identity (S-RNTI) carried in an associated scheduling signal on the PDCCH. Every handset checks the PDCCH with S-RNTI to receive the complete system information. There are multiple types of SIB in LTE systems, most of which have a configurable longer transmission cycle except SIB type-1 (SIB1). SIB1 is usually fix-scheduled for transmission in subframe #5 in every even frame, and its content is refreshed once every eight (8) frames. This means, the SIB1 content can be repetitively transmitted over a certain time cycle. As will be described later, to cancel or reduce such repetition of SIB1 transmissions can help cut down the PA-on time and achieve energy savings.

Besides a regular subframe that contains 14 symbols in the time domain, which is typically partitioned into PDCCH and PDSCH regions as described above, the LTE specification also defines the following two types of subframes: MBSFN subframe and a special subframe. As will be explained in detail below, the transmission of these two subframes can also contribute to the ES solutions in the time domain.

MBSFN subframe is a subframe that is defined to have the PDSCH region reserved for MBMS (Multicast Broadcast Multimedia Service) traffic. In other words, the MBSFN subframe excludes regular data traffic and CRS from its PDSCH region. Because of such configuration, a base station can use MBSFN subframes to identify a zero-transmission region so that a handset device or mobile station does not need to search for CRS within this region. Typically, the subframes {1, 2, 3, 6, 7, 8} are configured as MBSFN subframes in FDD systems, and the subframes {3, 4, 7, 8, 9} are configured as MBSFN subframes in TDD systems. It should be noted that MBSFN subframe has only one CRS symbol, i.e., symbol #0, and this feature can be considered for purposes of energy savings.

A special subframe is defined for TDD systems only. This subframe is used for downlink-to-uplink transition in the TDD system. The first several symbols of a special subframe (minimum to 3 symbols, called DwPTS) are used for downlink transmission, while the last several symbols (called UpPTS) are used for uplink transmission. For energy saving purposes, a minimum of three (3) symbols are adopted for downlink transmission, in which case, there is only one CRS symbol in the special subframe. The special subframe is usually configured in subframe #1, and also in subframe #6 for some special TDD allocation configurations. As shown in Table 1 below, subframe #1 is configured as a special subframe for all TDD allocations from 0 to 6, while subframe 6 is configured as a special subframe for select TDD allocations including allocation 0, 1, 2 and 6, but configured for downlink transmission for TDD allocations 3, 4 and 5.

TABLE 1

TDD allocation configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Among the time domain ES solutions currently considered in 3GPP LTE study, some ensure full backward compatibility, while others not. In the latter case, there are certain concerns regarding the partial or zero backward compatibility that need to be addressed in the proposed ES solution.

In order to maintain full backward compatibility, all mandatory downlink signals should be transmitted as required under the standards, and the MBSFN subframes should be used at the maximum. An exemplary downlink transmission and PA-on time distribution per frame with full backward compatibility is presented in FIGS. 3a-b. For illustration purposes, the following analysis of PA-on time is based on the assumption that the ramp-up time for a PA is a half symbol and the ramp-down time is almost zero. This means, from the time point to turn on a PA and transmit a number of (n) symbols to the time point of turning off the PA, the total PA-on time is n+0.5 symbols.

Figure 3A:
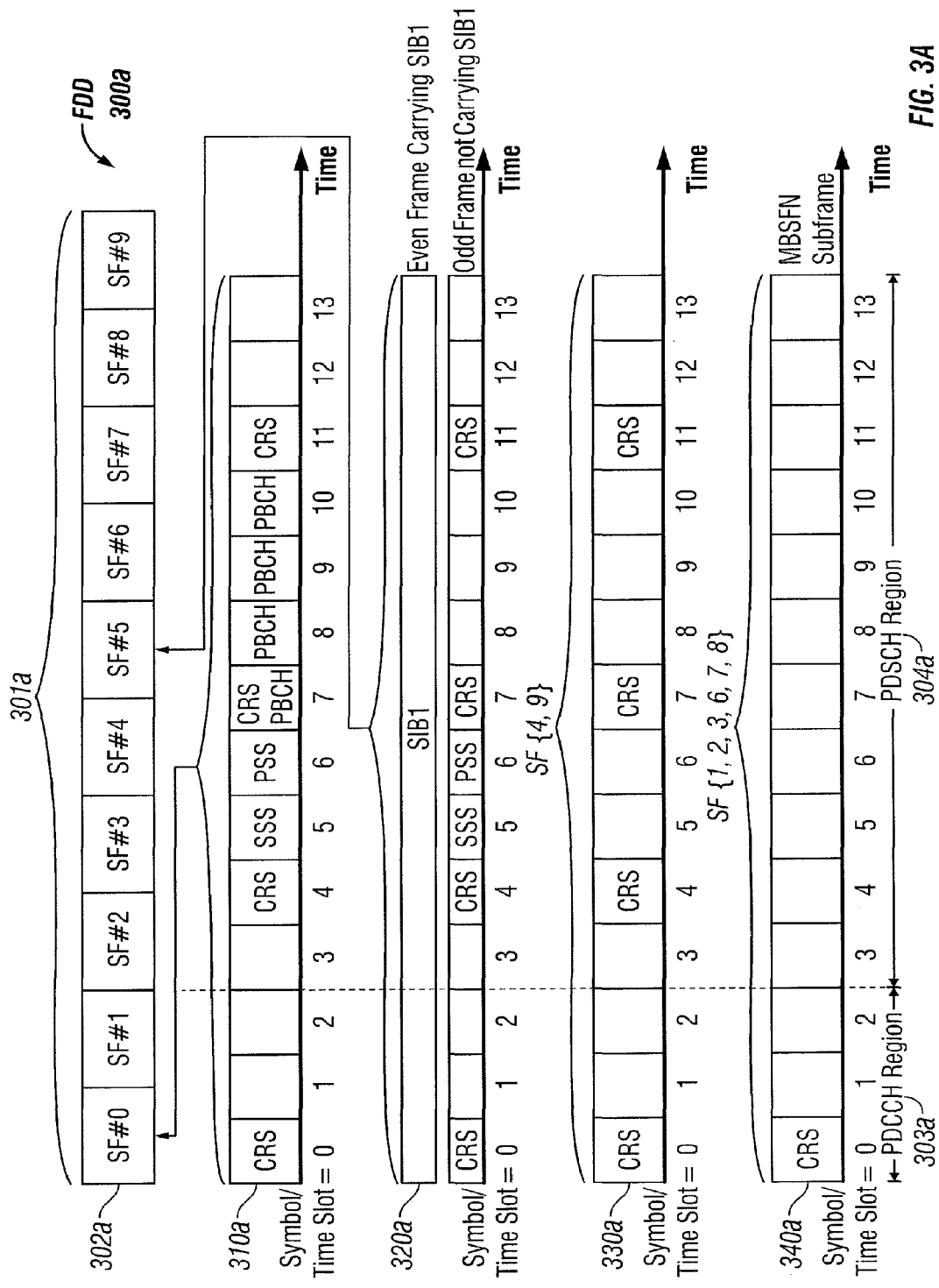
FIGS. 3a-b show an exemplary downlink transmission and PA-on time distribution per frame with full backward compatibility according to an embodiment.

FIG. 3a illustrates an exemplary downlink transmission and time distribution per frame with full backward compatibility in the FDD system 300a. The frame 301a comprises 10 subframes 302a including SF #1, SF #2 . . . SF #9. Each subframe is partitioned into the PDCCH region 303a and the PDSCH region 304a. As shown in FIG. 3a, the PDCCH region 303a covers symbols 0, 1 and 2, while the PDSCH region covers the remaining symbols 3, 4 . . . 12, 13. The transmission of each subframe in the time domain is demonstrated in time distributions 310a, 320a, 330a and 340a. For instance, as shown in time distribution 310a, the downlink transmission of subframe #0 comprises transmitting 4 CRS symbols {0, 4, 7, 11}, 4 PBCH symbols {7, 8, 9, 10} and 2 PSS/SSS symbols {5, 6}. In this transmission, there are two PA ramp-ups that occur right before the transmission of the CRS symbol 0 and the transmission of CRS symbol 4, respectively. As a result, the PA-on time covers 8 symbols {0, 4~11} plus two half symbols as ramp-up time, which in sum is 10 symbols. Time distribution 320a shows that subframe #5 is used for SIB1 transmission in an even frame, which takes a total of 14.5 symbols. In an odd frame, subframe #5 is configured to comprise 4 CRS symbols {0, 4, 7, 11} and 2 PSS/SSS symbols {5, 6}. In that regard, the PA-on time covers symbols {0, 4~7, 11} plus three half symbols for ramp-up, which in sum is 7.5 symbols. In other words, for subframe #5, there is 50% chance of 14.5 symbols and 50% chance of 7.5 symbols in the PA-on time. For subframes {4, 9}, time distribution 330a shows their downlink transmissions include 4 CRS symbols {0, 4, 7, 11}. Thus, the PA-on covers symbols {0, 4, 7, 11} plus 4 half symbols for ramp-up, which is a total of 6 symbols. As shown in time distribution 340a, all other downlink subframes {1, 2, 3, 6, 7, 8} are configured as MBSFN subframes containing only one CRS symbol {0}. The resulting total PA-on time is 1.5 symbols for each of these subframes. One exception is subframe #6, which, in even frames, does not need the half-symbol rump-up time due to a previously-continuous transmission of SIB1 in subframe #5, and thus has a different PA-on time of 1 symbol.

Figure 3B:
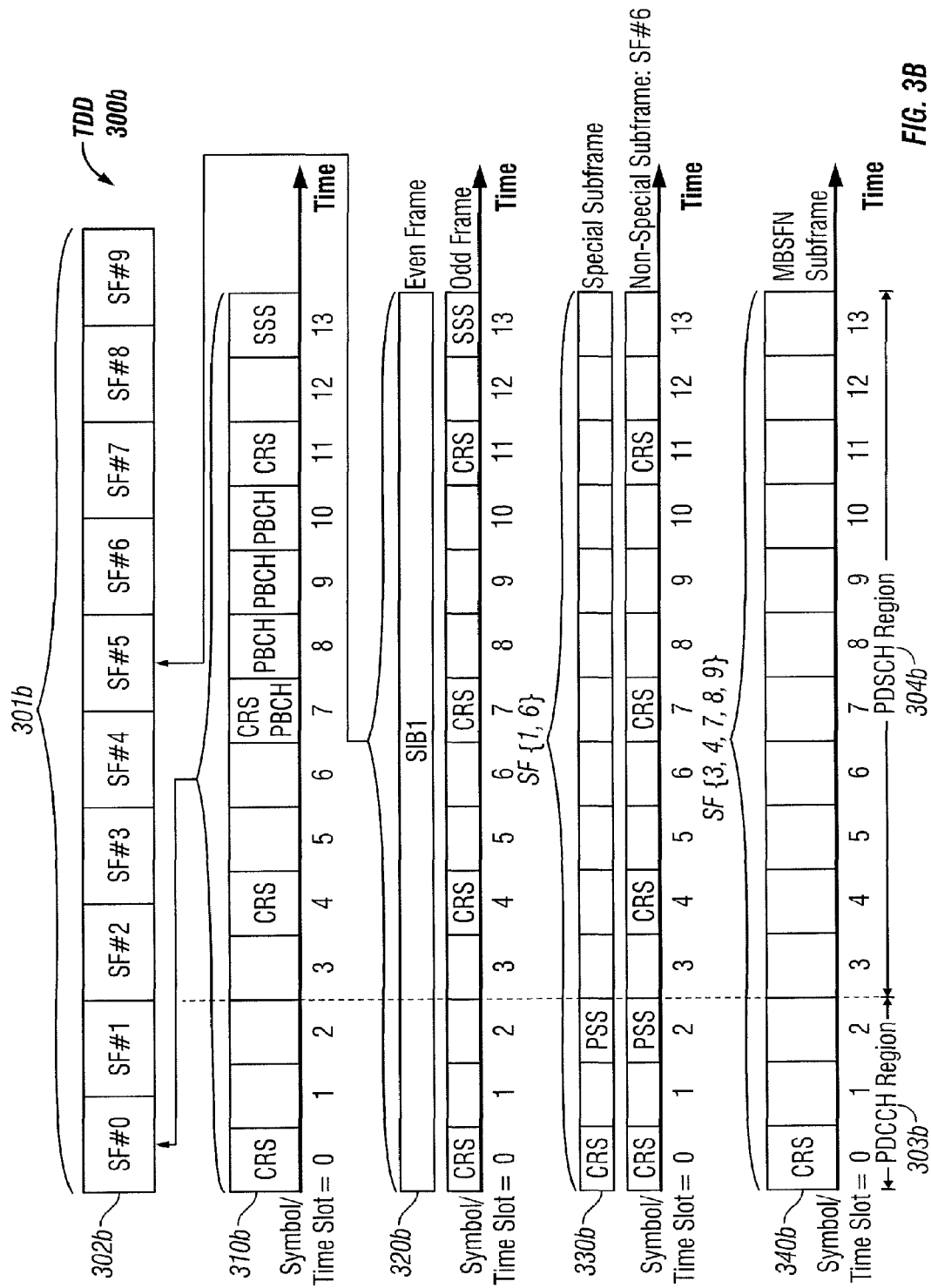

FIG. 3b illustrates an exemplary downlink transmission and time distribution per frame with full backward compatibility in the TDD system 300b. As shown in time distribution 310b, a downlink transmission of subframe #0 in the time domain comprises 4 CRS symbols {0, 4, 7, 11}, 4 PBCH symbols {7, 8, 9, 10} and 1 SSS symbol {13}. As such, the PA-on time for subframe #0 covers symbols {0, 4, 7-11, 13} plus 4 half symbols as ramp-up time, which in sum is 10 symbols. Time distribution 320b shows that subframe #5 is used for SIB1 transmission in an even frame, which takes a total of 14.5 symbols. In an odd frame, subframe #5 is configured to comprise 4 CRS symbols {0, 4, 7, 11} and 1 SSS symbol {13}. In that regard, the PA-on time covers symbols {0, 4, 7, 11, 13} plus 5 half symbols for ramp-up, which in sum is 7.5 symbols. As shown in time distribution 330b, subframes {1, 6} are configured as special subframes to cover 1 CRS symbol {0} and 1 PSS symbol {2}, which results in the total PA-on time of two symbols {0, 2} plus 1 half symbol for ramp-up, a total of 2.5 symbols. But for certain TDD allocations (e.g., TDD allocations 3, 4 and 5 in Table 1), subframe #6 is configured as a non-special downlink subframe, which includes 4 CRS symbols {0, 4, 7, 11} and 1 PSS symbol {2}. In that configuration, the PA-on time covers symbols {0, 2, 4, 7, 11} plus 4 half symbols for ramp-up, totaled to be 7 symbols. Other downlink subframes {3, 4, 7, 8, 9} are configured as MBSFN subframes each comprising 1 CRS symbol {0}, as presented in time distribution 340b. The PA-on time for each of these subframes is 1.5 symbols.

Table 2 below shows PA-on time distributions with full backward compatibility for both FDD and TDD:

{7, 8, 9, 10} and 2 PSS/SSS symbols {5, 6}. The total PA-on time covers symbols {5~11} plus one half symbol as ramp-up time, which in sum is 7.5 symbols. In comparison with the time distribution 310a in FIG. 3a, where full backward compatibility is provided, CRS symbols {0, 4} are muted in time distribution 410a for subframe #0, and thus the PA-on time is reduced by 2.5 symbols. Time distribution 420a shows that subframe #5 is used for SIB1 transmission in an even frame, which takes a total of 14.5 symbols. In an odd frame, subframe #5 is configured to comprise 2 PSS/SSS symbols {5, 6}, with all CRS symbols {0, 4, 7, 11} being muted. This results in the PA-on time of two symbols plus one half symbol for PA rump-up, a total of 2.5 symbols. Thus, for subframe #5, there is 50% chance of 14.5 symbols and 50% chance of 2.5 symbols in the PA-on time. For all other downlink subframes {1, 2, 3, 4, 6, 7, 8, 9}, as shown in time distributions 430a and 440a, there is zero PA-on time because all CRS symbols are muted.

Figure 4A:
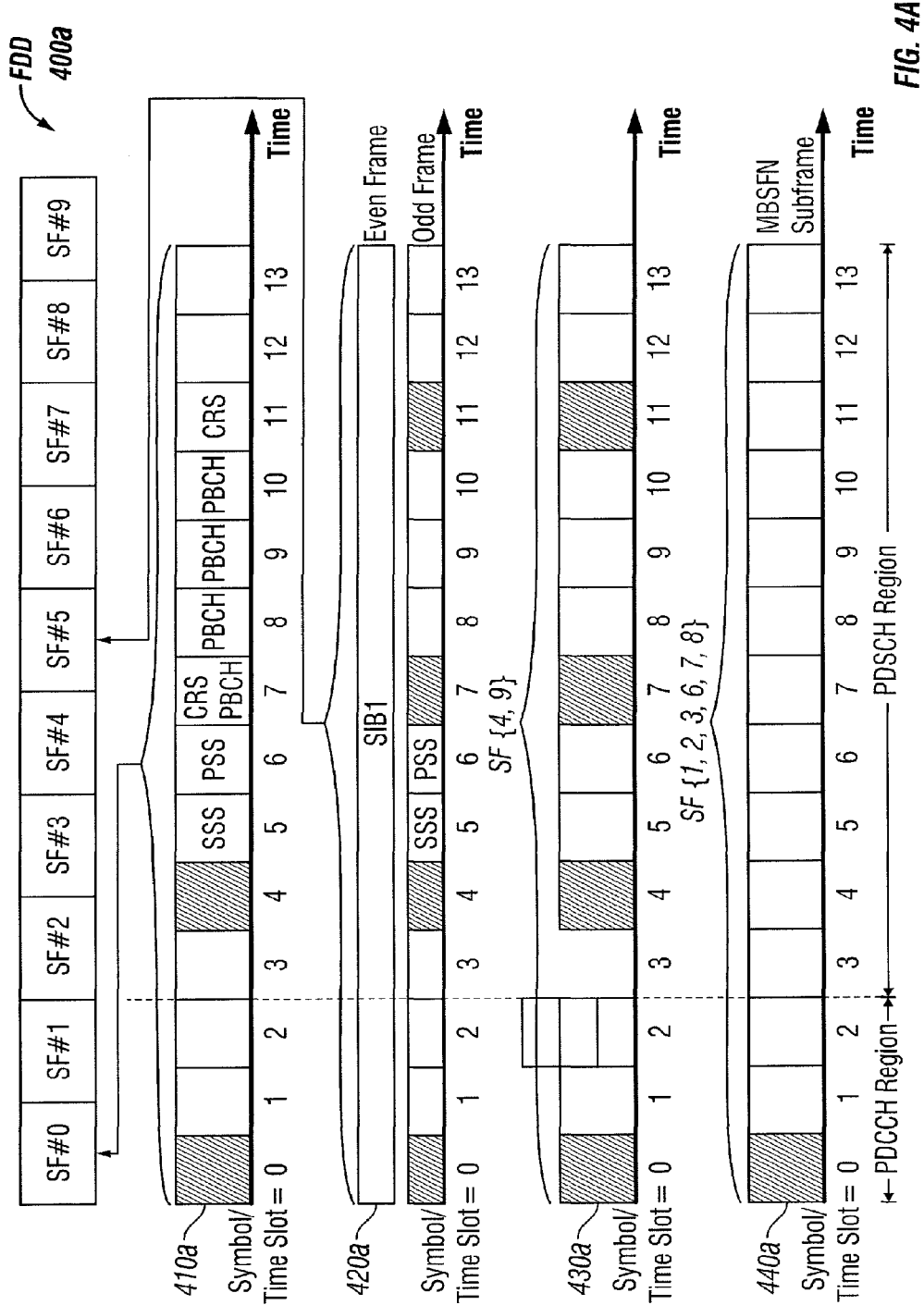
FIGS. 4a-b show an exemplary downlink transmission and PA-on time distribution per frame under a maximized ES scheme according to an embodiment.
Figure 4B:
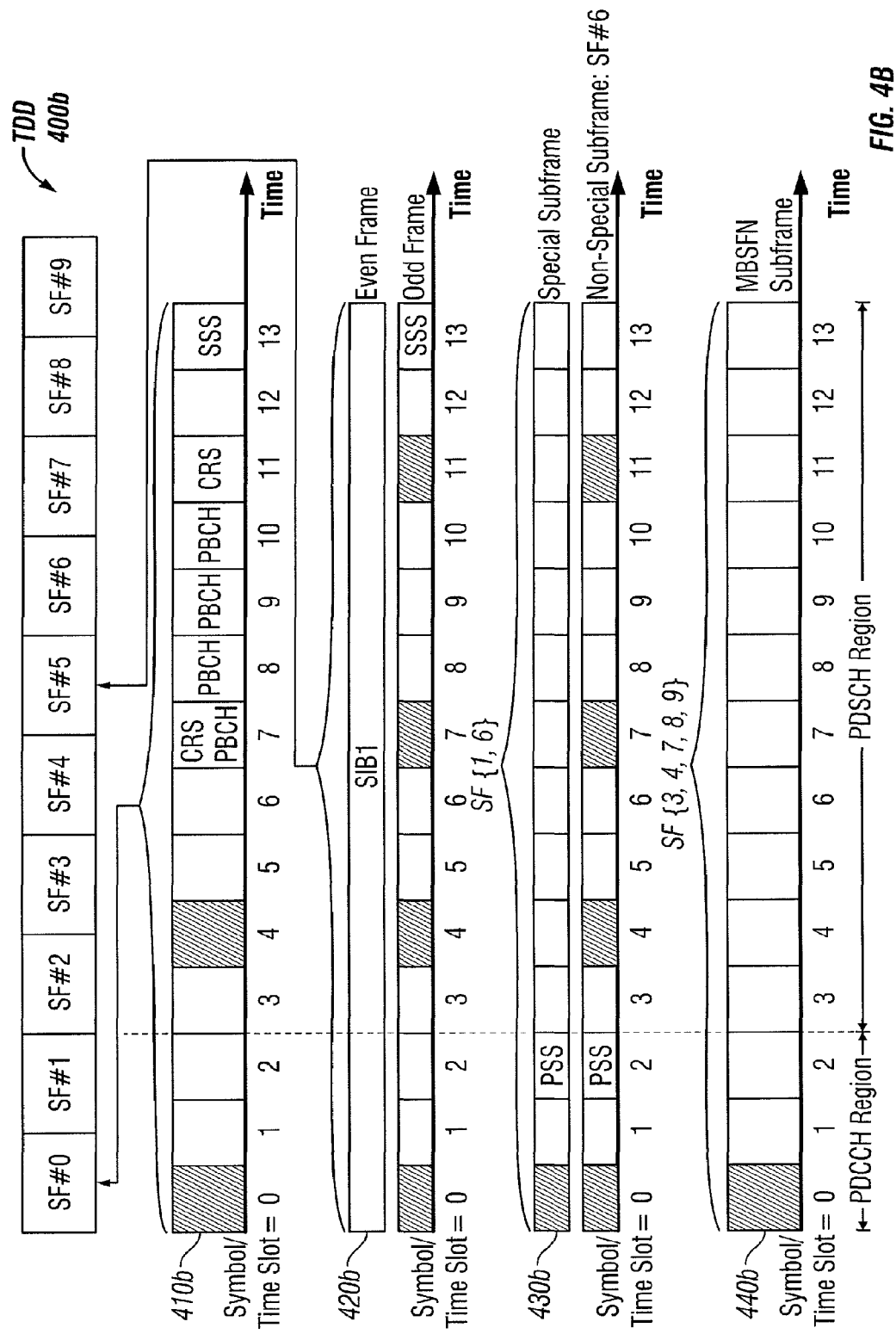

FIG. 4b illustrates an exemplary downlink transmission and time distribution per frame with Maximum CRS-DTX in the TDD system 400b. According to time distribution 410b, subframe #0 comprises 2 CRS symbols {7, 11}, 4 PBCH symbols {7, 8, 9, 10} and 1 SSS symbol {13}. As a result, the PA-on time covers symbols {7-11, 13} plus 2 half symbols for ramp-up, which is a total of 7 symbols. Because CRS symbols {0, 4} are muted in subframe #0, the PA-on time is reduced from 10 symbols to 7 symbols, if compared to the time distribution 310b in FIG. 3b. Time distribution 420b shows that subframe #5 is used for SIB1 transmission in an even frame, which takes a total of 14.5 symbols. In an odd frame, subframe #5 is configured to comprise 1 SSS symbol {13}, with CRS symbols {0, 4, 7, 11} not being transmitted, for which there is a total of 1.5 symbols of PA-on time. As shown in time distribution 430b, subframes {1, 6} are configured as special subframes to cover 1 PSS symbol {2}, which results in 1.5 symbols of PA-on time. For certain TDD allocations (as described above in FIG. 3b), subframe #6 is configured as non-special subframe, which covers 1 PSS symbol {2} as shown in time distribution 430b. This results in a total of 1.5 symbols as the PA-on time. For all other downlink subframes {3, 4, 7, 8, 9}, as shown in time distribution 440b, there is zero PA-on time because all CRS symbols are muted.

Under the Maximum CRS-DTX scheme, the PA-on time can be reduced by muting CRS symbols. However, if a large number of CRS symbols are not transmitted, there will be little support for backward compatibility, which may cause many issues for legacy UEs in the LTE network. Table 3 below includes some measurements showing the lack of

TABLE 2

PA-on time distribution w/full backward compatibility

| | | Subframe | | | | | | | | | | PA-on fraction |
|---|---|---|---|---|---|---|---|---|---|---|---|---|
| | | 0 | 1 | 2 | 3 | 4 | 5 | 6 | 7 | 8 | 9 | |
| TDD configurations | 0 | 10 | 2.5 | — | — | — | 14.5 in even frame; 7.5 in odd frame | 2.5 | — | — | — | 18.6% |
| | 1 | | | — | — | 1.5 | | | — | — | 1.5 | 20.7% |
| | 2 | | | — | 1.5 | 1.5 | | | — | 1.5 | 1.5 | 22.3% |
| | 6 | | | — | — | — | | | — | — | 1.5 | 19.6% |
| | 3 | | | — | — | — | | 7 | 1.5 | 1.5 | 1.5 | 25% |
| | 4 | | | — | — | 1.5 | | | 1.5 | 1.5 | 1.5 | 26.1% |
| | 5 | | | — | 1.5 | 1.5 | | | 1.5 | 1.5 | 1.5 | 27.1% |
| FDD | | 10 | 1.5 | 1.5 | 1.5 | 6 | 14.5 in even frame; 7.5 in odd frame | 1.5 in even frame; 1 in odd frame | 1.5 | 1.5 | 6 | 29.8% |

To minimize the PA-on time, one solution proposed by 3GPP RAN1 is to mute or disable the transmission of CRS as long as such muting or non-transmission does not affect the reception of PBCH and SIB1. This ES solution is referred as Maximum CRS-DTX in the following description. An exemplary downlink transmission and PA-on time distribution per frame using the Maximum CRS-DTX scheme is illustrated in FIGS. 4a-4b.

FIG. 4a illustrates an exemplary downlink transmission and time distribution per frame with Maximum CRS-DTX in the FDD system 400a. As shown in time distribution 410a, the downlink transmission of subframe #0 comprises transmissions of 2 CRS symbols {7, 11}, 4 PBCH symbols backward compatibility, such as the number of remaining CRS REs and muted CRS REs (lost to legacy UE) per port per subframe. Note that $N_{RB}^{DL}$ denotes the bandwidth measured in the unit of RB.

PDSCH region stays on. Following the above example, $\Psi_{PDCCH}=\{0, 5\}$ means that the non-selected subframes or subframes not belonging to $\Psi_{PDCCH}$ are subframes $\{1$-$4, 6$-$9\}$, and the CRS symbol (symbol 0) in each of these

TABLE 3

PA-on time distributions w/maximized CRS-DTX

| | | \multicolumn{10}{c}{Subframe} | PA-on fraction | # of CRS RE remaining per port per frame (average) | # of CRS RE per port per frame lost to legacy UE (average) |
|---|---|---|---|---|---|---|---|---|---|---|---|---|---|---|
| | | 0 | 1 | 2 | 3 | 4 | 5 | 6 | 7 | 8 | 9 | | | |
| TDD allocations | 0 | 7 | 1.5 | — | — | — | 14.5 in even frame; 1.5 in odd frame | 1.5 | — | — | — | 12.9% | $8N_{RB}^{DL}$ | $12N_{RB}^{DL}$ |
| | 1 | | | — | — | 0 | | | — | — | 0 | | | $16N_{RB}^{DL}$ |
| | 2 | | | 0 | 0 | | | — | 0 | 0 | | | $20N_{RB}^{DL}$ |
| | 6 | | | — | — | — | | | — | — | 0 | | | $14N_{RB}^{DL}$ |
| | 3 | | | — | — | — | | 1.5 | 0 | 0 | 0 | | | $24N_{RB}^{DL}$ |
| | 4 | | | — | — | 0 | | | 0 | 0 | 0 | | | $26N_{RB}^{DL}$ |
| | 5 | | | — | 0 | 0 | | | 0 | 0 | 0 | | | $28N_{RB}^{DL}$ |
| FDD | | 7.5 | 0 | 0 | 0 | 0 | 14.5 in even frame; 2.5 in odd frame | 0 | 0 | 0 | 0 | 11.4% | $8N_{RB}^{DL}$ | $36N_{RB}^{DL}$ |

Figure 8:
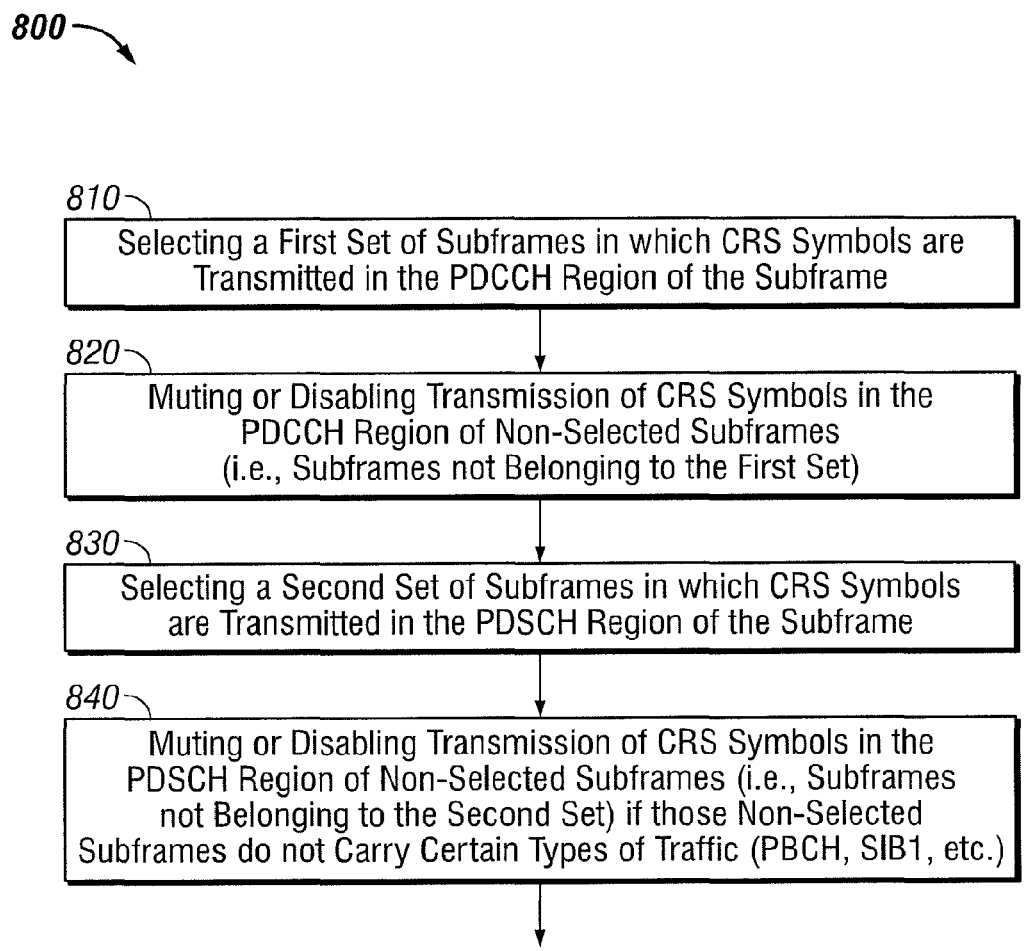
FIG. 8 is a flow diagram illustrating an exemplary algorithm for reducing power consumption in downlink transmissions according to an embodiment.

Alternative time domain ES solutions are needed to address the backward compatibility issues. In general, these ES solutions should aim at reducing the number of CRS symbols to be muted and providing a better balance between energy savings and backward compatibility in the LTE systems. In other words, rather than muting most CRS symbols under the Maximum CRS-DTX solution, the alternative time domain ES solutions will selectively mute CRS symbols. So the question becomes, which CRS symbols or how many CRS symbols should be muted. FIG. 8 presents an exemplary algorithm for determining the CRS symbols for no transmission in one embodiment of the invention.

As shown in FIG. 8, the selectively-muting process 800 for determining muted or non-transmitted CRS symbols includes two subframe selections: selecting a set of subframes in which CRS symbols are transmitted in the PDCCH region of the subframe in step 810, and selecting a set of subframes in which CRS symbols are transmitted in the PDSCH region of the subframe in step 830. These two selections can be represented by the following denotations:

$\Psi_{PDCCH}=\{i\}$, where i is the index or indices of the selected subframes in which CRS symbols are transmitted in the PDCCH region;

$\Psi_{PDSCH}=\{j\}$ where j is the index or indices of the selected subframes in which CRS symbols are transmitted in the PDSCH region.

For example, $\Psi_{PDCCH}=\{0, 5\}$ means subframe #0 and subframe #5 are the selected subframes in which at least a CRS symbol (symbol 0) is transmitted in the PDCCH region. On the other hand, $\Psi_{PDSCH}=\{4, 9\}$ means subframe #4 and subframe #9 are selected subframes in which CRS symbols (e.g., symbols 4, 7, 11) are transmitted in the PDSCH region.

After the subframes are selected, certain CRS symbols in those non-selected subframes may be muted or non-transmitted. Specifically, as shown in step 820, for subframes not selected in the first group (i.e., subframes not belonging to $\Psi_{PDCCH}$), the CRS symbols in their PDCCH regions are muted. For subframes not selected in the second group (i.e., subframes not belonging to $\Psi_{PDSCH}$); as explained at step 840, the CRS symbols in their PDSCH regions to $\Psi_{PDSCH}$ are muted if that subframe does not carry either PBCH or PDSCH; otherwise the transmission of CRS symbols in the PDSCH region stays on. Following the above example, $\Psi_{PDCCH}=\{0, 5\}$ means that the non-selected subframes or subframes not belonging to $\Psi_{PDCCH}$ are subframes $\{1$-$4, 6$-$9\}$, and the CRS symbol (symbol 0) in each of these subframes is muted. On the other hand, $\Psi_{PDSCH}=\{4, 9\}$ means that the non-selected subframes or subframes not belonging to $\Psi_{PDCCH}$ are subframes $\{0$-$3, 5$-$8\}$. For each of these subframes, the CRS symbols (symbols 4, 7, 11), if any, can be muted if the subframe does not carry PBCH or PDSCH. Because subframe #0 and subframe #5 usually carry PBCH or SIB traffic, the CRS symbols (symbols 4, 7, 11) in those frames are still transmitted.

Following the above-discussed CRS-muting algorithm, many possible ES schemes can be formulated depending on which subframes are selected in $\Psi_{PDCCH}$ and $\Psi_{PDSCH}$, respectively. The following paragraphs will describe a few exemplary ES schemes implementing the above selective CRS-muting or CRS-DTX process.

CRS-DTX-Opt-1

Under this option, CRS is transmitted in the PDCCH region of every downlink subframe, and CRS is muted in the PDSCH region in any subframe having neither PBCH nor PDSCH. This means, $\Psi_{PDCCH}=\{$all downlink subframes having PDCCH$\}$, and $\Psi_{PDSCH}=\emptyset$. Note that the CRS symbols falling within the PDSCH region of subframes $\{0, 5\}$ are still transmitted due to the presence of PBCH or SIB1 in those subframes.

CRS-DTX-Opt-2

Under this option, all CRS symbols, including symbols in both PDCCH and PDSCH regions, are transmitted in select subframes, for example, subframes $\{0, 5\}$. CRS symbols are muted in other subframes not carrying PBCH or PDSCH. This means, $\Psi_{PDCCH}=\Psi_{PDSCH}=\{$selected subframes$\}$, namely, subframes $\{0, 5\}$ in this example.

CRS-DTX-Opt-3

This option transmits CRS in the PDSCH region to meet the minimum requirement for demodulation of PBCH and SIB1, which means, $\Psi_{PDSCH}=\{0, 5\}$. In addition, CRS in the PDCCH region is transmitted in the subframes carrying PBCH or SIB1 and the subframes following transmission of PBCH or SIB1, which means, $\Psi_{PDCCH}=\{0, 1, 5$ $6\}$.

Another solution to further reduce the PA-on time without causing negative impact upon the physical layer procedures in the LTE system is to cancel the repetition of SIB1 transmission. This solution is referred as No-SIB1-repetition in the following description. Given that the contents of SIB1 are refreshed once every eight (8) frames, SIB1 does not need to be transmitted in every other frame but every one of eight frames. Its duty cycle is thus reduced from ½ to ⅛. The transmission of SIB1 in each subframe remains the same as in the 3GPP LTE standard specification. This solution can be used in combination with any one of the above CRS-muting options, which will be described in detail in the following paragraphs with reference to FIGS. 5a-b, 6a-b and 7a-b.

Figure 5A:
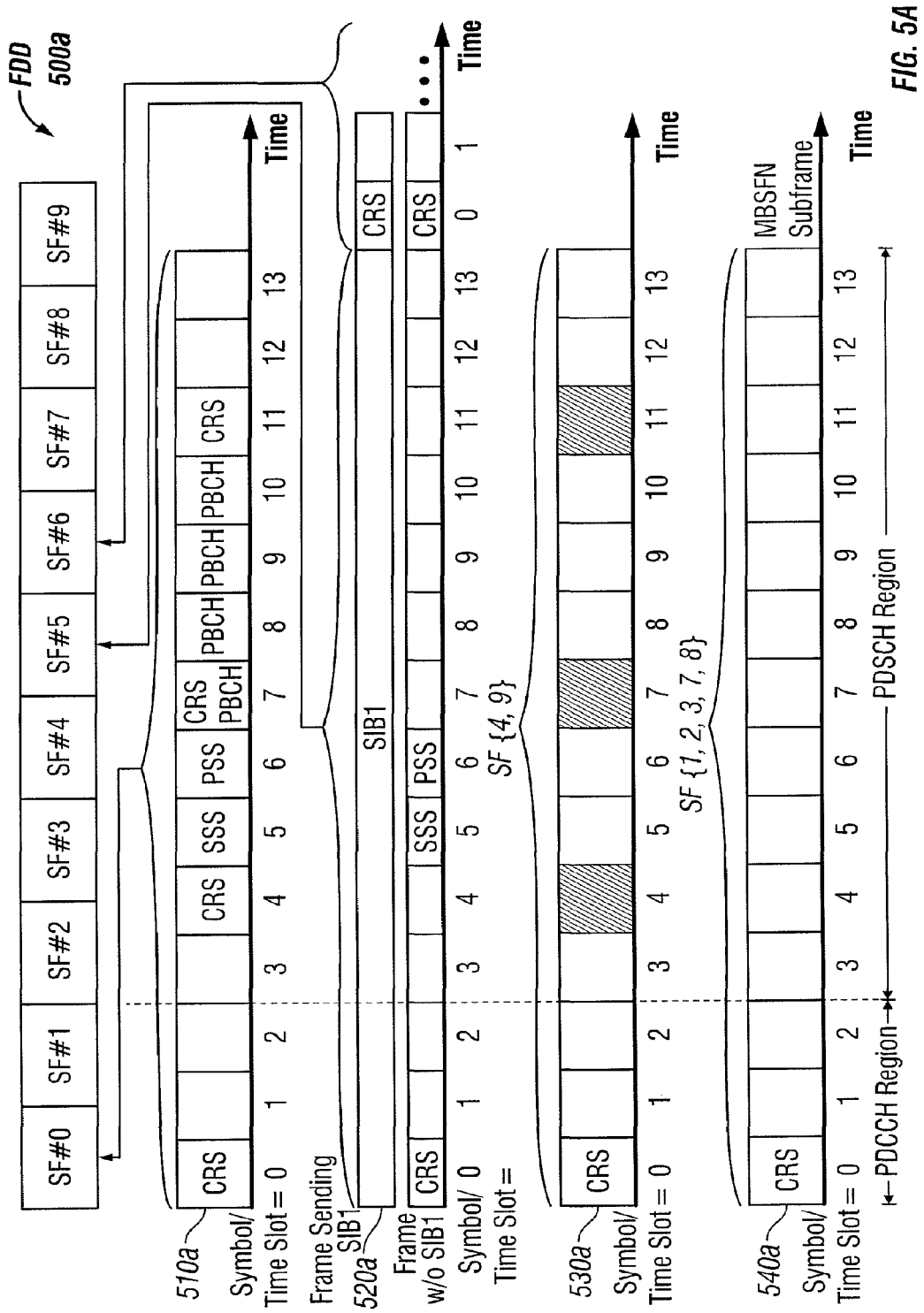
FIGS. 5a-b show an exemplary downlink transmission and PA-on time distribution per frame under a first ES scheme according to an embodiment.
Figure 5B:
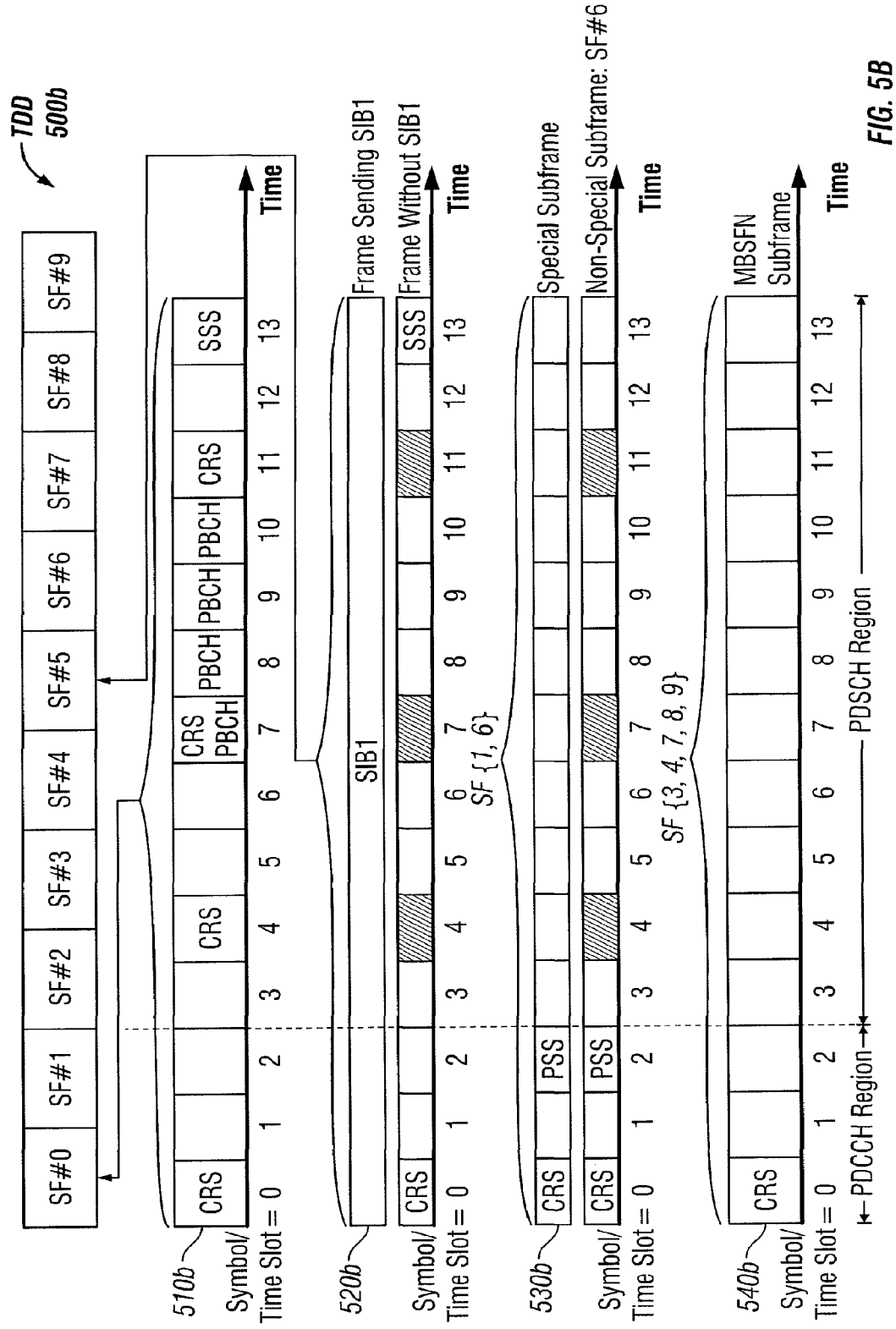

FIGS. 5a-b illustrate an exemplary downlink transmission and PA-on time distribution per frame under an ES scheme combining CRS-DTX-Opt-1 and No-SIB1-repetition. Under this scheme, CRS symbols in the PDCCH region of all subframes are transmitted, while CRS symbols in the PDSCH region of all subframes are muted except for the subframes carrying PBCH or SIB1.

In the FDD system 500a illustrated in FIG. 5a, a downlink transmission of subframe #0 is comprised of transmissions of 4 CRS symbols {0, 4, 7, 11}, 4 PBCH symbols {7, 8, 9, 10}, 2 PSS/SSS symbols {5, 6} according to time distribution 510a. As such, the PA-on time covers symbols {0, 4~11} plus 2 half symbols as ramp-up time, which in sum is 10 symbols. As shown in time distribution 520a, subframe #5 in a frame sending SIB1 is configured to cover 14.5 symbols for SIB1 traffic transmission. When subframe #5 is in a frame without SIB1, it is configured to cover one CRS symbol {0}, 2 PSS/SSS symbols {5, 6}, which means the total PA-on time covers symbols {0, 5~6} plus 2 half symbols for ramp-up and totals to be 4 symbols. Time distribution 520a also shows that subframe #6 in the frame sending SIB1 is configured to cover 1 CRS symbol {0} to be transmitted immediately after the transmission of SIB1 in subframe #5. Thus, no ramp-up time is needed in this configuration, and the total PA-on time is 1 symbol. For subframe #6 in the frame not sending SIB1, it covers 1 CRS symbol {0} and the PA-on time is 1.5 symbols. As a result, depending on whether the frame transmits SIB1, the total PA-on time for transmissions of subframes {5, 6} can be 15.5 (=14.5+1) symbols or 5.5 (=4+1.5) symbols. With the No-SIB1-repetition solution, transmission of SIB1 occurs every one out of eight frames. Thus, there is ⅛ chance of 15.5 symbols of PA-on time and ⅞ chance of 5.5 symbols of PA-on time. Time distributions 530a and 540a show that all other downlink subframes are configured to carry 1 CRS symbol {0} with a total of 1.5 symbols of PA-on time.

In the TDD system 500b shown in FIG. 5b, subframe #0 carries 4 CRS symbols {0, 4, 7, 11}, 4 PBCH symbols {7, 8, 9, 10} and 1 SSS symbol {13} as shown in time distribution 510b. That means, the PA-on time covers {0, 4, 7-11, 13} plus 4 half symbols for ramp-up, resulting a total of 10 symbols. Time distribution 520b shows that subframe #5 in a frame sending SIB1 has PA-on time of 14.5 symbols, and if in a frame containing no SIB1, the subframe #5 covers 1 CRS symbols {0} and 1 SSS symbol 113), resulting in the PA-on time covering symbols {0, 13} plus 2 half symbols for ramp-up, a total of 3 symbols. With the No-SIB1-repetition solution, there is ⅛ chance of 14.5 symbols of PA-on time and ⅞ chance of 3 symbols of PA-on time for subframe #5. As shown in time distribution 530b, subframes {1, 6} are configured as special subframes to cover 1 CRS symbol {0} and 1 PSS symbol {2}. That means, the PA-on time covers symbols {0, 2} plus 1 half symbol for ramp-up, a total of 2.5 symbols. For certain TDD allocations, subframe #6 is configured as a non-special subframe, which carries 1 CRS symbols {0} and 1 PSS symbol {2}. In that configuration, the total PA-on time covers symbols {0, 2} plus 1 half symbol for ramp-up, a total of 2.5 symbols. Time distribution 540b shows all other downlink subframes {3, 4, 7, 8, 9} are configured to cover 1 CRS symbol {0} with 1.5 symbols of PA-on time.

Compared to the Maximum CRS-DTX scheme, the number of muted CRS symbols under this scheme is reduced, thereby leaving a larger number of remaining CRS REs per port per frame for a better backward compatibility, as shown in Table 4 below:

TABLE 4

PA-on time distributions w/CRS-DTX-Opt-1 and No-SIB1-repeat

| | | Subframe | | | | | | | | | | PA-on fraction | # of CRS RE remaining per port per frame (minimum) | # of CRS RE per port per frame lost to legacy UE (maximum) |
|---|---|---|---|---|---|---|---|---|---|---|---|---|---|---|
| | | 0 | 1 | 2 | 3 | 4 | 5 | 6 | 7 | 8 | 9 | | | |
| TDD allocations | 0 | 10 | 2.5 | — | — | — | 14.5 w/⅛ chance; 3 w/⅞ chance | 2.5 | — | — | — | 13.9% | $14N_{RB}^{DL}$ | $6N_{RB}^{DL}$ |
| | 1 | | | — | — | 1.5 | | | — | — | 1.5 | 16% | $18N_{RB}^{DL}$ | |
| | 2 | | | — | 1.5 | 1.5 | | | — | 1.5 | 1.5 | 18.2% | $22N_{RB}^{DL}$ | |
| | 6 | | | — | — | — | | | — | — | 1.5 | 15% | $16N_{RB}^{DL}$ | |
| | 3 | | | — | — | — | | 2.5 | 1.5 | 1.5 | 1.5 | 17.1% | $20N_{RB}^{DL}$ | $12N_{RB}^{DL}$ |
| | 4 | | | — | — | 1.5 | | | 1.5 | 1.5 | 1.5 | 18.2% | $22N_{RB}^{DL}$ | |
| | 5 | | | — | 1.5 | 1.5 | | | 1.5 | 1.5 | 1.5 | 19.2% | $24N_{RB}^{DL}$ | |
| FDD | | 10 | 1.5 | 1.5 | 1.5 | 1.5 | 15.5 for ⅛ chance; 5.5 for ⅞ chance | | 1.5 | 1.5 | 1.5 | 19.5% | $26N_{RB}^{DL}$ | $18N_{RB}^{DL}$ |

Figure 6A:
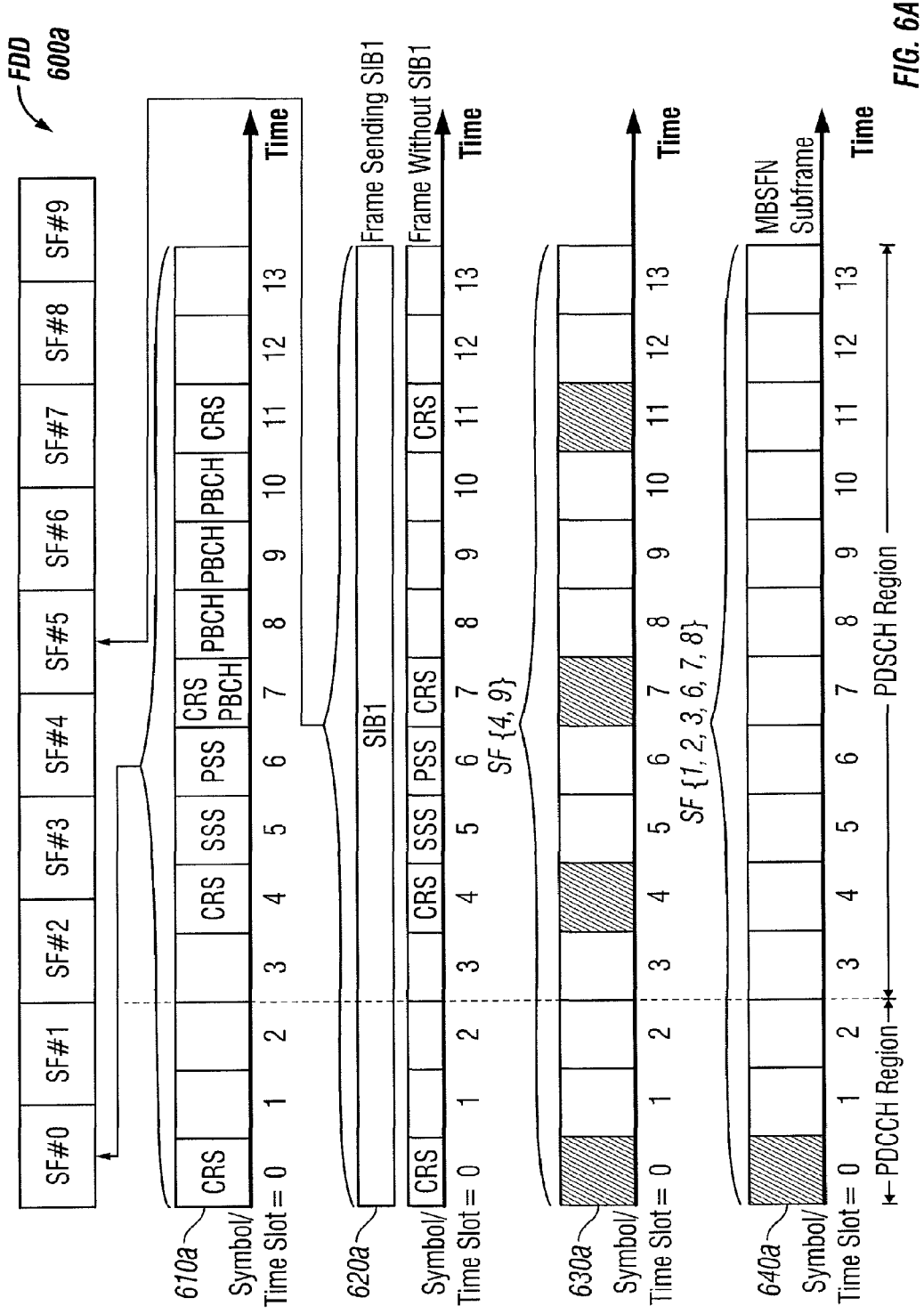

FIGS. 6a-b illustrate an exemplary downlink transmission and PA-on time distribution per frame under an ES scheme combining CRS-DTX-Opt-2 and No-SIB1-repetition. Under this scheme, all CRS symbols, including symbols in both PDCCH and PDSCH regions, are transmitted in subframes {0, 5}, and CRS symbols are muted in other subframes {1-4, 6-9} unless the subframe carries PBCH or PDSCH.

In the FDD system 600a illustrated in FIG. 6a, time distribution 610a shows that subframe #0 is configured to carry 4 CRS symbols {0, 4, 7, 11}, 4 PBCH symbols {7, 8, 9, 10} and 2 PSS/SSS symbols {5, 6}. Thus, the PA-on time covers symbols {0, 4~11} plus 2 half symbols for ramp-up, which in sum is 10 symbols. As shown in time distribution 620a, subframe #5 in a frame containing SIB1 comprises 14.5 symbols in PA-on time. In frames not sending SIB1; subframe #5 is configured to cover 4 CRS symbol {0, 4, 7, 11} and 2 PSS/SSS symbols {5, 6}. That means, the PA-on time covers symbols {0, 4~7, 11} plus 3 half symbols for ramp-up, a total of 7.5 symbols. With the No-SIB1-repetition solution, there is ⅛ chance of 14.5 symbols of PA-on time and ⅞ chance of 7.5 symbols of PA-on time for subframe #5. For all other subframes {1-4, 6-9}, time distributions 630a and 640a show that there is zero PA-on time because all CRS symbols are muted.

In the TDD system 600b illustrated in FIG. 6b, time distribution 610b shows that subframe #0 is configured to cover 4 CRS symbols {0, 4, 7, 11}, 4 PBCH symbols {7, 8, 9, 10} and 1 SSS symbol {13}. In this configuration, the PA-on time covers symbols {0, 4, 7-11, 13}, which is in sum 10 symbols. As shown in time distribution 620b, subframe #5 is configured to cover 14.5 symbols in a frame containing SIB1. In the frame without SIB1; subframe #5 is configured to cover CRS symbols {0, 4, 7, 11} and 1 SSS symbol {13}. In this configuration, the PA-on time is a total of 7.5 symbols. With the No-SIB1-repetition solution, there is ⅛ chance of 14.5 symbols of PA-on time and ⅞ chance of 7.5 symbols of PA-on time for subframe #5. Time distribution 630b shows that subframes {1, 6} are configured as special subframes that cover 1 PSS symbol {2}, which results in the total PA-on time of 1.5 symbols. For certain TDD allocations, subframe #6 is configured as a non-special subframe that covers 1 PSS symbol {2}, with the PA-on time of 1.5 symbols. For all other downlink subframes, as shown in time distribution 640b, there is zero PA-on time because all CRS symbols are muted.

Compared to the Maximum CRS-DTX solution, this ES scheme also reduces the number of muted CRS symbols, thereby leaving a larger number of remaining CRS REs per port per frame for a better backward compatibility, as shown in Table 5 below:

symbols {0, 47, 11} plus 3 half symbol for ramp-up, which is a total of 7.5 symbols. Time distribution 720a also shows that subframe #6 in the frame sending SIB1 is configured to cover 1 CRS symbol {0} to be transmitted immediately after the transmission of SIB1 in subframe #5. Thus, no ramp-up time is needed in this configuration, and the total PA-on time is 1 symbol. For subframe #6 in the frame not sending SIB1, it covers 1 CRS symbol {0} and the PA-on time is 1.5 symbols. As a result, depending on whether the frame transmits SIB1, the total PA-on time for transmissions of subframes {5, 6} can be 15.5 (=14.5+1) symbols or 9 (=7.5+1.5) symbols. With the No-SIB1-repetition solution, transmission of SIB1 occurs every one out of eight frames. Thus, there is ⅛ chance of 15.5 symbols of PA-on time and ⅞ chance of 9 symbols of PA-on time. Time distribution 740a shows that in subframe #1, 1 CRS symbol {0} is transmitted in the PDCCH region, which results in 1.5 symbols of PA-on time. All other subframes {2, 3, 4, 7, 8, 9}, as seen in time distributions 730a and 740a, have zero PA-on time because all CRS symbols are muted in these frames.

Figure 7A:
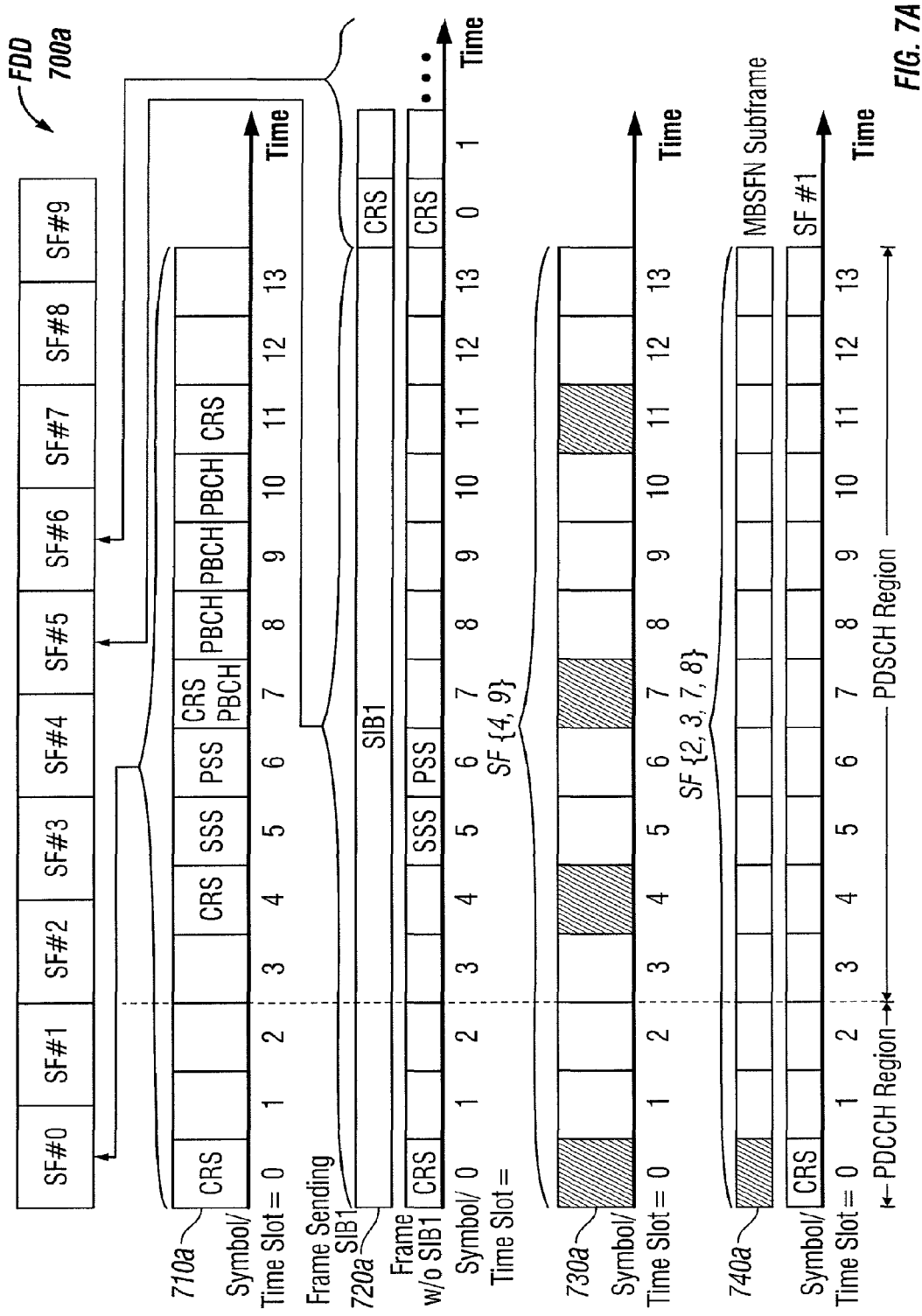
FIGS. 7a-b show an exemplary downlink transmission and PA-on time distribution per frame under a third ES scheme according to an embodiment.
Figure 7B:
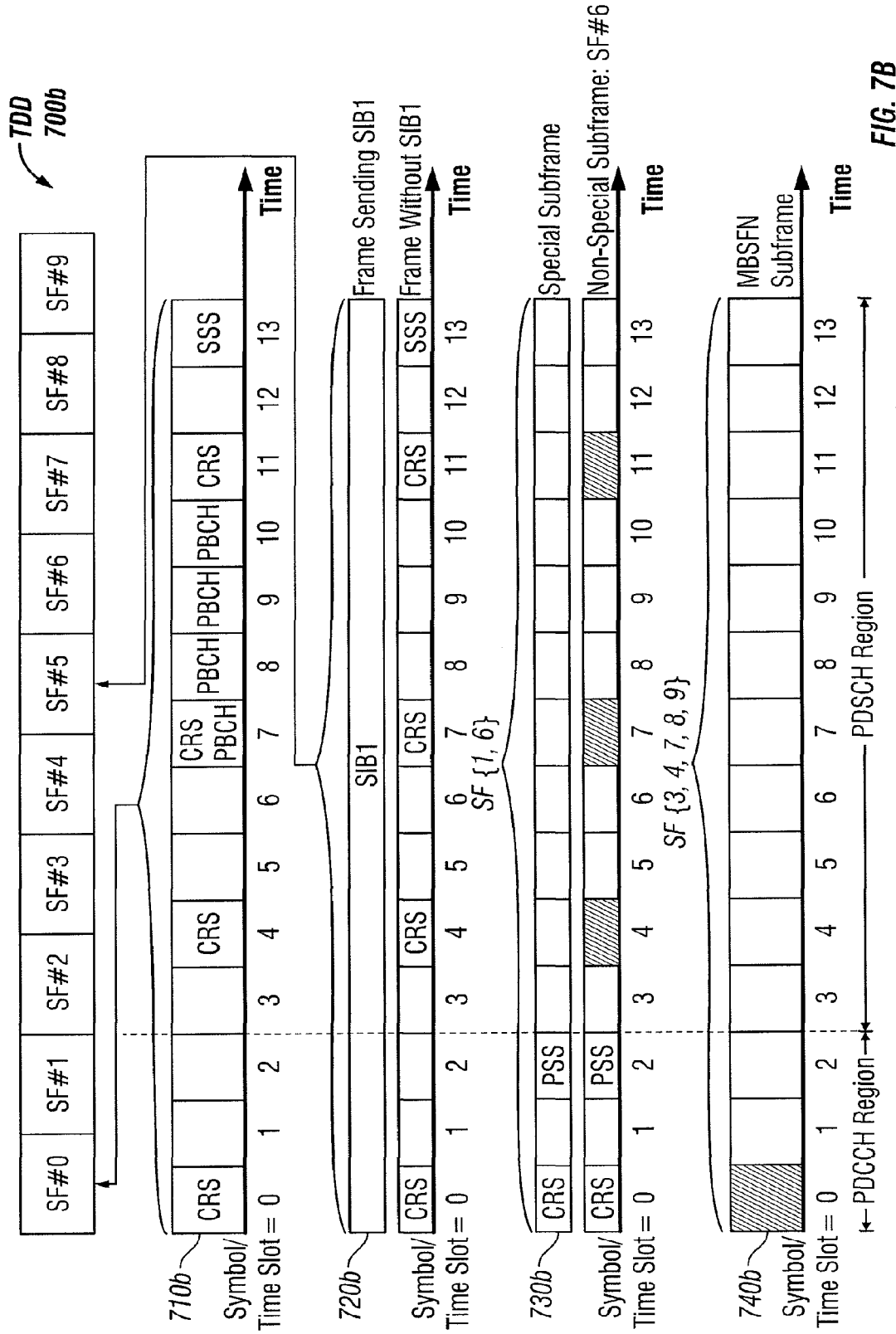

In the TDD system 700b illustrated in FIG. 7b, time distribution 710b shows subframe #0 carries 4 CRS symbols {0, 4, 7, 11}, 4 PBCH symbols {7, 8, 9, 10} and 1 SSS symbols {13}. That means the PA-on time covers symbols {0, 4, 7-11, 13} plus 4 half symbols for ramp-up, a total of 10 symbols. Time distribution 720b shows that subframe #5 has PA-time of 14.5 symbols for in a frame sending SIB1. In a frame without SIB1, the subframe #5 carries 4 CRS

TABLE 5

PA-on time distributions w/CRS-DTX-Opt-2 and No-SIB1-repeat

| | | Subframe | | | | | | | | | | PA-on fraction | # of CRS RE remaining per port per frame (minimum) | # of CRS RE per port per frame lost to legacy UE (minimum) |
|---|---|---|---|---|---|---|---|---|---|---|---|---|---|---|
| | | 0 | 1 | 2 | 3 | 4 | 5 | 6 | 7 | 8 | 9 | | | |
| TDD allocations | 0 | 10 | 1.5 | — | — | — | 14.5 w/⅛ chance; 7.5 w/⅞ chance | 1.5 | — | — | — | 15.3% | $16N_{RB}^{DL}$ | $4N_{RB}^{DL}$ |
| | 1 | | | — | — | 0 | | | — | — | 0 | | | $8N_{RB}^{DL}$ |
| | 2 | | | — | 0 | 0 | | — | — | 0 | 0 | | | $12N_{RB}^{DL}$ |
| | 6 | | | — | — | — | | — | — | — | 0 | | | $6N_{RB}^{DL}$ |
| | 3 | | | — | — | — | | 1.5 | 0 | 0 | 0 | | | $16N_{RB}^{DL}$ |
| | 4 | | | — | — | 0 | | | 0 | 0 | 0 | | | $18N_{RB}^{DL}$ |
| | 5 | | | — | 0 | 0 | | | 0 | 0 | 0 | | | $20N_{RB}^{DL}$ |
| FDD | | 10 | 0 | 0 | 0 | 0 | | 0 | 0 | 0 | 0 | 13.1% | $16N_{RB}^{DL}$ | $28N_{RB}^{DL}$ |

FIGS. 7a-b illustrate an exemplary downlink transmission and PA-on time distribution per frame under an ES scheme combining CRS-DTX-Opt-3 and No-SIB1-repetition. Under this scheme, the CRS symbols are transmitted in the PDSCH region of subframes {0, 5} in order to meet the minimum requirement for demodulation of PBCH and SIB1. In addition, CRS in the PDCCH region is transmitted in the subframes {0, 1, 5 6}.

In the FDD system 700a illustrated in FIG. 7a, time distribution 710a shows that subframe #0 is configured to carry 4 CRS symbols {0, 4, 7, 11}, 4 PBCH symbols {7, 8, 9, 10} and 2 PSS/SSS symbols {5, 6}. So the PA-on time covers symbols {0, 4~11} plus 2 half symbols for ramp-up, resulting a total of 10 symbols. As shown in time distribution 720a, subframe #5 covers 14.5 symbols for SIB1 transmission in a frame sending SIB1. If in a frame without SIB1, subframe #5 carries 4 CRS symbol {0, 4, 7, 11} and 2 PSS/SSS symbols {5, 6}, resulting in PA-on time covering symbol {0, 4, 7, 11} and 1 SSS symbols {13}, which results in PA-on time of 7.5 symbols. With the No-SIB1-repetition solution, there is ⅛ chance of 14.5 symbols of PA-on time and ⅞ chance of 7.5 symbols of PA-on time for subframe #5. Time distribution 730b shows subframes {1, 6} are configured as special subframes that have 1 CRS symbol {0} and 1 PSS symbol {2}. In this configuration, the PA-on time is two symbols {0, 2} plus 1 half symbol for ramp-up, a total of 2.5 symbols. For certain TDD allocations, subframe #6 is configured as a non-special subframe, which covers 1 CRS symbol {0} and 1 PSS symbol {2}, with total PA-on of 2.5 symbols. Time distribution 740b shows that all other subframes {3, 4, 7, 8, 9} have zero PA-on time because all CRS symbols are muted in these frames.

Compared to the Maximum CRS-DTX solution, this ES scheme reduces the number of muted CRS symbols while leaving a larger number of remaining CRS REs per port per frame for sufficient backward compatibility, as shown in Table 6 below:

TABLE 6

PA-on time distributions w/CRS-DTX-Opt-3 and No-SIB1-repeat

| | | Subframe | | | | | | | | | | PA-on fraction | # of CRS RE remaining per port per frame (minimum) | # of CRS RE per port per frame lost to legacy UE (minimum) |
|---|---|---|---|---|---|---|---|---|---|---|---|---|---|---|
| | | 0 | 1 | 2 | 3 | 4 | 5 | 6 | 7 | 8 | 9 | | | |
| TDD allocations | 0 | 10 | 2.5 | — | — | — | 14.5 w/1/8 chance; 7.5 w/7/8 chance | 2.5 | — | — | — | 16.7% | $20N_{RB}^{DL}$ | 0 |
| | 1 | | | — | — | 0 | | — | — | — | 0 | | | $4N_{RB}^{DL}$ |
| | 2 | | | — | 0 | 0 | | — | 0 | 0 | | | | $8N_{RB}^{DL}$ |
| | 6 | | | — | — | — | | — | — | — | 0 | | | $2N_{RB}^{DL}$ |
| | 3 | | | — | — | — | | 0 | 0 | 0 | | | | $12N_{RB}^{DL}$ |
| | 4 | | | — | — | 0 | | 0 | 0 | 0 | | | | $14N_{RB}^{DL}$ |
| | 5 | | | — | 0 | 0 | | 0 | 0 | 0 | | | | $16N_{RB}^{DL}$ |
| FDD | | 10 | 1.5 | 0 | 0 | 0 | 15.5 for 1/8 chance; 9 for 7/8 chance | 0 | 0 | 0 | | 15.2% | $20N_{RB}^{DL}$ | $24N_{RB}^{DL}$ |

It should be understood that the above ES schemes are for illustration purposes only, and depending on different choices of $\Psi_{PDCCH}$ and $\Psi_{PDSCH}$ there can be many other possible CRS-muting or CRS-DTX configurations and implementations without departing from the spirit of the invention. For instance, choosing $\Psi_{PDCCH}=\{1, 5, 6\}$ and $\Psi_{PDSCH}=\{0, 5\}$ can bring a different CRS-muting option as compared to CRS-DTX-Opt-3 as discussed above.

A further analysis of the data in the above Tables 2-6 suggests some additional techniques can be employed for energy saving purposes. For instance, in TDD systems the TDD allocation #0 tends to have the minimal PA-on fraction no matter which specific subframes are selected in $\Psi_{PDCCH}$ and $\Psi_{PDSCH}$. In addition, TDD allocation #0 also tends to have the least amount of CRS lost to legacy UE. This is because the TDD allocation #0 is usually an allocation of the least amount of downlink transmission time. Accordingly, additional energy savings may be achieved if the TDD allocation can be adjusted dynamically to receive similar benefits as TDD allocation #0. To that end, however, the TDD allocation ratio may need frequent adjustments and in different geographical areas. This is can be practically difficult because a single direct change in the TDD downlink-uplink allocation ratio typically needs system-wide synchronization. This problem can be solved by introducing some techniques that not only allow the TDD allocation ratio to be changed asynchronously in a wireless system, but also enable using different TDD allocation ratios in different geographical areas. These techniques are specified in select pending patent applications, including U.S. Provisional Application Ser. No. 61/027,412, filed Feb. 8, 2008 and entitled "Dynamic Adjustment of Downlink/Uplink Allocation Ratio in TDD Wireless Systems," U.S. Provisional Patent Application No. 61/039,072 filed on Mar. 24, 2008, entitled "Method for Signaling Downlink/Uplink Allocation Ratio Adjustment in LTE/TDD System," U.S. Provisional Patent Application No. 61/138,896 filed Dec. 18, 2008, entitled "Method and System for Dynamic Adjustment of Downlink/Uplink Allocation Ratio in LTE/TDD System," U.S. regular utility patent application Ser. No. 61/027,412 filed Feb. 6, 2009, entitled "Dynamic Adjustment of Downlink/Uplink Allocation Ratio in TDD Wireless Systems," U.S. regular utility patent application Ser. No. 61/039,072 filed Mar. 24, 2009, entitled "Dynamic Adjustment and Signaling of Downlink/Uplink Allocation Ratio in LTE/TDD systems," and U.S. provisional patent application Ser. No. 61/173,535 filed Apr. 28, 2009, entitled "Method for Live-Change of Downlink/Uplink Allocation Ratio in LTE/TDD System." The contents of all these applications are incorporated herein by reference in their entirety.

Table 7 below provides a comparison of energy savings and backward compatibility among the above-described ES schemes using different CRS-DTX solutions. In general, among all CRS-DTX methods for both FDD and TDD systems, the lower the PA-on fraction, the higher percentage of CRS is lost to legacy UE. When it comes to each CRS-DTX method, however, one CRS-DTX method may provide a lower PA-on fraction in FDD systems but does not make a better solution for the TDD systems. Accordingly, in order to achieve the best energy savings, FDD and TDD systems may be configured with different CRS-DTX methods and schemes.

TABLE 7

Comparison among different CRS-DTX methods

| | FDD | | TDD | |
|---|---|---|---|---|
| CRS-DTX methods | PA-on fraction | % of lost CRS | PA-on fraction | % of lost CRS |
| Max-CRS-DTX | 8.21% | 81.82% | 9.38% | 60% |
| CRS-DTX-Opt-1 | 19.46% | 40.91% | 13.88% | 30% |
| CRS-DTX-Opt-2 | 13.13% | 63.64% | 15.27% | 20% |
| CRS-DTX-Opt-3 | 15.22% | 54.55% | 16.7% | 0 |
| Full backward compatibility | 27.81% | 0 | 16.7% | 0 |

Figure 9:
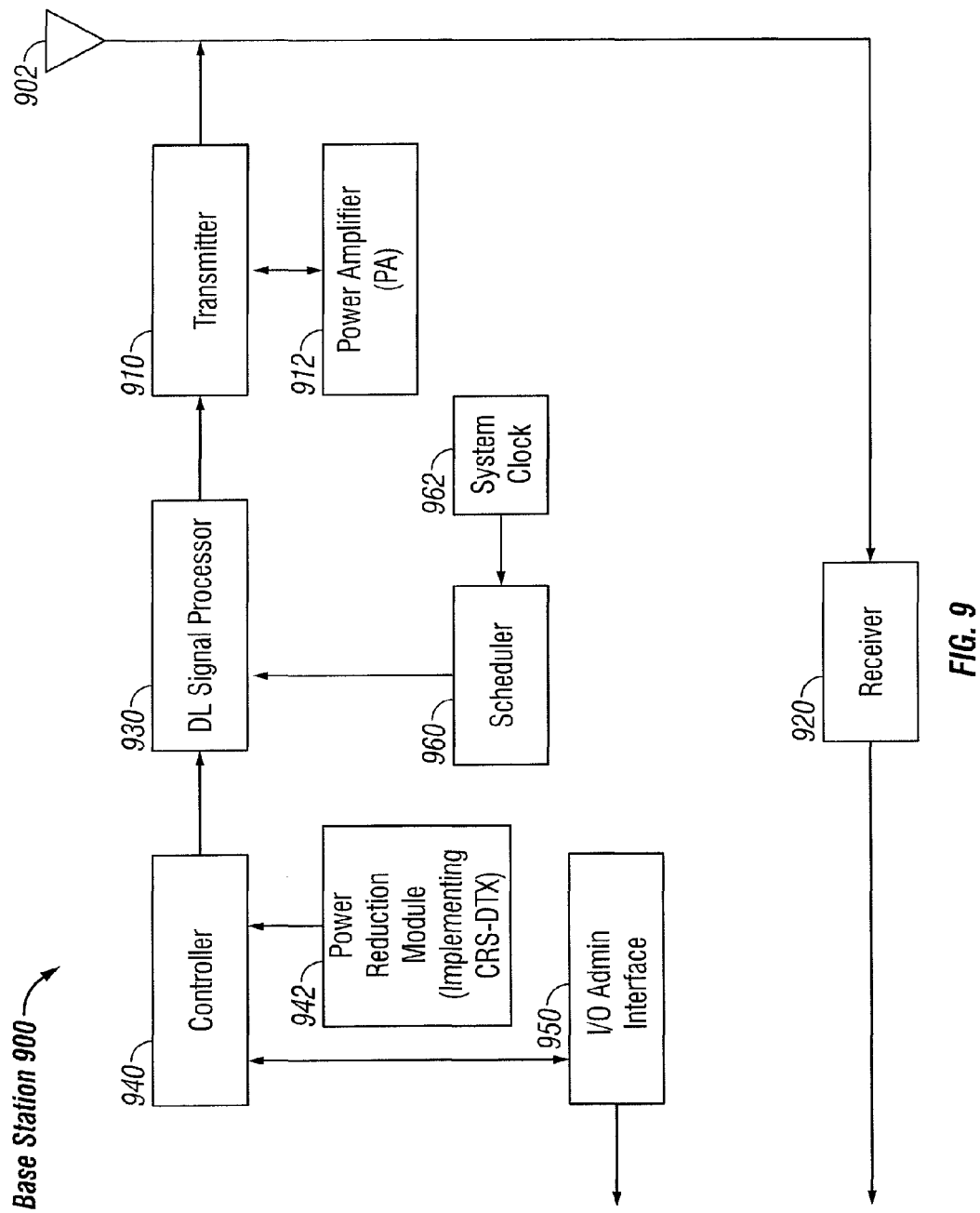
FIG. 9 is a simplified functional block diagram of an exemplary base station in which embodiments of the invention can be implemented.

FIG. 9 is a simplified functional block diagram of an exemplary base station 900 in which embodiments of the invention can be implemented. The base station 900 can be, for example, the first base station 110a shown in the wireless communication system of FIG. 1. The base station 900 includes the capabilities to configure and support the CRS-DTX or CRS-muting methods and different ES schemes according to various embodiments of the invention. It should be noted that certain portions of the base station 900 that operate to support the ES capabilities will be described, while other portions of the base station 900 are omitted for the purposes of brevity and clarity.

The base station 900 includes an antenna 902 coupled to an output of a transmitter 910 as well as to an input of a receiver 920. The transmitter 910 is couple to one or more power amplifiers (PA) 912 in which the power consumption can be reduced using the ES schemes described herein. A downlink signal processor 930 is coupled to the transmitter 910 for downlink transmission from the base station. More specifically, the DL signal processor 930 is typically coupled to an input of one or more multiplexers (not shown) and the active multiplexer path, as determined by a scheduler 960 coupled to the processor 930, is coupled to the transmitter 910 for downlink transmission. The scheduler 960, as a time management unit in the base station, is coupled to a system clock 962. A controller 940 is coupled to the DL signal processor 930. Typically, the controller 940 is configured to control the performance of the base station by coordinating different computing and processing tasks. In one embodiment, the controller 940 is coupled to or configured with a power reduction module 942. The power reduction module 942 can comprise computer codes and instructions implementing such an algorithm as shown in FIG. 8 for enabling different ES schemes using CRS-DTX methods and many other techniques for power reduction. An Input/Output administrative interface 950 is coupled to the controller 940. It usually serves as an interface between the base station 900 and other network components or networks such as the backhaul network 130 in FIG. 1.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present invention should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for energy savings in a wireless communication system, comprising:
reducing downlink transmissions of a reference signal by selectively muting reference signal symbols in a plurality of subframes of a frame in accordance with an energy saving (ES) scheme, each subframe divided into a first region and a second region,
wherein the ES scheme is configured to select from the plurality of subframes a first set of subframes having reference signal symbols transmitted in their first region and a second set of subframes having reference signal symbols transmitted in their second region; and
disabling transmissions of reference signal symbols in the first region of all other subframes outside the first set of subframes in accordance with the ES scheme.

2. The method of claim 1, wherein the wireless communication system is a long term evolution (LTE) system.

3. The method of claim 2, wherein the reference signal is a cell-specific reference signal (CRS), the first region of each subframe is configured to carry a physical layer control channel (PDCCH), and the second region of each subframe is configured to carry a physical layer shared channel (PDSCH).

4. The method of claim 2, wherein each subframe is at least one of a regular subframe, a MBSFN subframe and a special subframe used in a TDD system.

5. The method of claim 1, wherein each subframe comprises a plurality of symbols in a time domain, one or more symbols in each frame carrying either a control signal or a content signal, and the reference signal is a type of control signal.

6. A method for energy savings in a wireless communication system, comprising:
reducing downlink transmissions of a reference signal by selectively muting reference signal symbols in a plurality of subframes of a frame in accordance with an energy saving (ES) scheme, each subframe divided into a first region and a second region,
wherein the ES scheme is configured to select from the plurality of subframes a first set of subframes having reference signal symbols transmitted in their first region and a second set of subframes having reference signal symbols transmitted in their second region;
identifying subframes outside the second set of subframes;
excluding subframes that carry at least a content signal symbol from the identified subframes to determine remaining subframes; and
disabling transmissions of reference signal symbols in the second region of the remaining subframes in accordance with the ES scheme.

7. The method of claim 1, wherein the wireless communication system is configured to provide downlink transmissions of a content signal according to a repetition pattern, and the ES scheme is configured to modify or cancel the repetition pattern for downlink transmitting the content signal.

8. The method of claim 1, wherein the wireless communication system includes a frequency division duplex (FDD) system and a time division duplex (TDD) system.

9. The method of claim 8, wherein the ES scheme is configured to incorporate dynamic adjustments of uplink and downlink allocations in the TDD system.

* * * * *